United States Patent
Minami et al.

(10) Patent No.: US 12,435,384 B2
(45) Date of Patent: *Oct. 7, 2025

(54) HIGH-STRENGTH STEEL SHEET AND METHOD FOR MANUFACTURING SAME

(71) Applicant: JFE STEEL CORPORATION, Tokyo (JP)

(72) Inventors: Hidekazu Minami, Tokyo (JP); Takeshi Yokota, Tokyo (JP); Yoshiyasu Kawasaki, Tokyo (JP); Shotaro Terashima, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 626 days.

This patent is subject to a terminal disclaimer.

(21) Appl. No.: 17/630,504

(22) PCT Filed: Jun. 19, 2020

(86) PCT No.: PCT/JP2020/024251
§ 371 (c)(1),
(2) Date: Jan. 27, 2022

(87) PCT Pub. No.: WO2021/019947
PCT Pub. Date: Feb. 4, 2021

(65) Prior Publication Data
US 2022/0251676 A1    Aug. 11, 2022

(30) Foreign Application Priority Data

Jul. 30, 2019   (JP) ................................. 2019-140307

(51) Int. Cl.
*C22C 38/00* (2006.01)
*B32B 15/01* (2006.01)
(Continued)

(52) U.S. Cl.
CPC .............. *C21D 9/46* (2013.01); *B32B 15/013* (2013.01); *C21D 1/22* (2013.01); *C21D 6/002* (2013.01);
(Continued)

(58) Field of Classification Search
CPC ..... C22C 38/001; C22C 38/002; C22C 38/22; C22C 38/58
See application file for complete search history.

(56) References Cited

U.S. PATENT DOCUMENTS 10,174,396 B2    1/2019   Takashima et al.
10,501,832 B2   12/2019   Hayashi et al.
(Continued)

FOREIGN PATENT DOCUMENTS

CN        105940134 A      9/2016
EP          3101147 A1    12/2016
(Continued)

OTHER PUBLICATIONS

Aug. 31, 2022, Office Action issued by the China National Intellectual Property Administration in the corresponding Chinese Patent Application No. 202080046726.2 with English language search report.

(Continued)

*Primary Examiner* — Sally A Merkling
*Assistant Examiner* — Sean P. O'Keefe
(74) *Attorney, Agent, or Firm* — KENJA IP LAW PC

(57) ABSTRACT

Provided are a high-strength hot-dip galvanized steel sheet that has a tensile strength of 1180 MPa or more and excellent ductility, stretch flangeability, bendability and LME resistance and can manufacture parts with high dimensional accuracy, and its manufacturing method. The high-strength steel sheet with a tensile strength of 1180 MPa or more has a chemical composition containing C, Si, Mn, P, S, Al and (Continued)

N, with [% Si], [% Mn], [% P], [% Mo] and [% Cr] satisfying a predetermined relationship and the balance being Fe and inevitable impurities, and a steel microstructure including ferrite, tempered martensite and bainite, and retained austenite, where the diffusible hydrogen amount in the steel sheet is 0.60 mass ppm or less, a thickness of softened surface layer is 5 μm or more and 150 μm or less, and a frequency of coincidence boundary in the steel sheet surface layer after a high-temperature tensile test is 0.45 or less.

8 Claims, 1 Drawing Sheet

(51) Int. Cl.
| | | |
|---|---|---|
| C21D 1/22 | (2006.01) | |
| C21D 6/00 | (2006.01) | |
| C21D 8/02 | (2006.01) | |
| C21D 9/46 | (2006.01) | |
| C22C 38/04 | (2006.01) | |
| C22C 38/20 | (2006.01) | |
| C22C 38/22 | (2006.01) | |
| C22C 38/24 | (2006.01) | |
| C22C 38/26 | (2006.01) | |
| C22C 38/28 | (2006.01) | |
| C22C 38/30 | (2006.01) | |
| C22C 38/32 | (2006.01) | |
| C22C 38/44 | (2006.01) | |
| C22C 38/58 | (2006.01) | |

(52) U.S. Cl.
CPC ............ *C21D 6/004* (2013.01); *C21D 6/005* (2013.01); *C21D 6/007* (2013.01); *C21D 6/008* (2013.01); *C21D 8/0205* (2013.01); *C21D 8/0226* (2013.01); *C21D 8/0236* (2013.01); *C22C 38/001* (2013.01); *C22C 38/002* (2013.01); *C22C 38/005* (2013.01); *C22C 38/008* (2013.01); *C22C 38/04* (2013.01); *C22C 38/20* (2013.01); *C22C 38/22* (2013.01); *C22C 38/24* (2013.01); *C22C 38/26* (2013.01); *C22C 38/28* (2013.01); *C22C 38/30* (2013.01); *C22C 38/32* (2013.01); *C22C 38/44* (2013.01); *C22C 38/58* (2013.01); *C21D 2211/001* (2013.01); *C21D 2211/002* (2013.01); *C21D 2211/005* (2013.01); *C21D 2211/008* (2013.01)

(56) References Cited

U.S. PATENT DOCUMENTS

| | | | |
|---|---|---|---|
| 11,274,356 | B2 | 3/2022 | Takeda et al. |
| 11,408,058 | B2 | 8/2022 | Minami et al. |
| 12,258,646 | B2 * | 3/2025 | Minami ................. C21D 6/005 |
| 2016/0369369 | A1 * | 12/2016 | Takashima ............. C22C 38/16 |
| 2017/0096723 | A1 | 4/2017 | Kasuya et al. |
| 2017/0204490 | A1 * | 7/2017 | Kawasaki ............... C22C 38/02 |
| 2019/0226067 | A1 | 7/2019 | Minami et al. |
| 2020/0040420 | A1 | 2/2020 | Minami et al. |
| 2020/0190617 | A1 | 6/2020 | Hasegawa et al. |
| 2021/0010115 | A1 | 1/2021 | Yoshitomi et al. |
| 2021/0381075 | A1 | 12/2021 | Minami et al. |
| 2022/0195552 | A1 * | 6/2022 | Minami ................. C22C 18/02 |

FOREIGN PATENT DOCUMENTS

| | | | |
|---|---|---|---|
| EP | 3394300 | A1 | 10/2018 |
| EP | 3415655 | A1 | 12/2018 |
| JP | 2007302918 | A | 11/2007 |
| JP | 2015193897 | A | 11/2015 |
| JP | 2017048412 | A | 3/2017 |
| JP | 6747612 | B1 | 8/2020 |
| KR | 1020190044105 | A | 4/2019 |
| WO | 2016171237 | A1 | 10/2016 |
| WO | 2018043474 | A1 | 3/2018 |
| WO | 2018054787 | A1 | 3/2018 |
| WO | 2018124157 | A1 | 7/2018 |
| WO | 2018147400 | A1 | 8/2018 |
| WO | 2019116531 | A1 | 6/2019 |
| WO | 2019189842 | A1 | 10/2019 |

OTHER PUBLICATIONS

May 20, 2022, Ruling on the Patent Opposition issued by the Japan Patent Office in the corresponding Japanese Patent No. 6901050 with English language concise statement of relevance.

Apr. 10, 2024, Office Action issued by the Korean Intellectual Property Office in the corresponding Korean Patent Application No. 10-2021-7042496 with English language concise statement of relevance.

Jun. 3, 2022, the Extended European Search Report issued by the European Patent Office in the corresponding European Patent Application No. 20846448.7.

Satyam S. Sahay, Annealing of Steel, ASM Handbook, vol. 4A, Steel Heat Treating Fundamentals and Processes, 2013, pp. 289-304.

N.A., Typical atmosphere types and composition, Sep. 3, 2010, pp. 1-1, XP055797164, Retrieved from the Internet: URL: https://www.industrialheating.com/ext/resources/IH/Home/Images/ih0910-htdr-table1-lg.jpg, retrieved on Apr. 20, 2021.

Jan. 3, 2024, Office Action issued by the Korean Intellectual Property Office in the corresponding Korean Patent Application No. 10-2021-7042496 with English language concise statement of relevance.

Sep. 8, 2020, International Search Report issued in the International Patent Application No. PCT/JP2020/024251.

Jul. 21, 2025, Office Action issued by the China National Intellectual Property Administration in the corresponding Chinese Patent Application No. 202080046726.2 with English language concise statement of relevance.

Jul. 24, 2025, Communication pursuant to Article 94(3) EPC issued by the European Patent Office in the corresponding European Patent Application No. 20846448.7.

Jun. 12, 2025, Office Action issued by the China National Intellectual Property Administration in the corresponding Chinese Patent Application No. 202080046726.2 with English language concise statement of relevance.

Naeem Yousaf, Calculation of waste heat from hot rolled steel coils at SSAB and its recovery Naeem Yousaf Degree Project Mech. Engineering 2009 Nr: E 3813M, Feb. 3, 2010, Högskolan Dalarna.

* cited by examiner

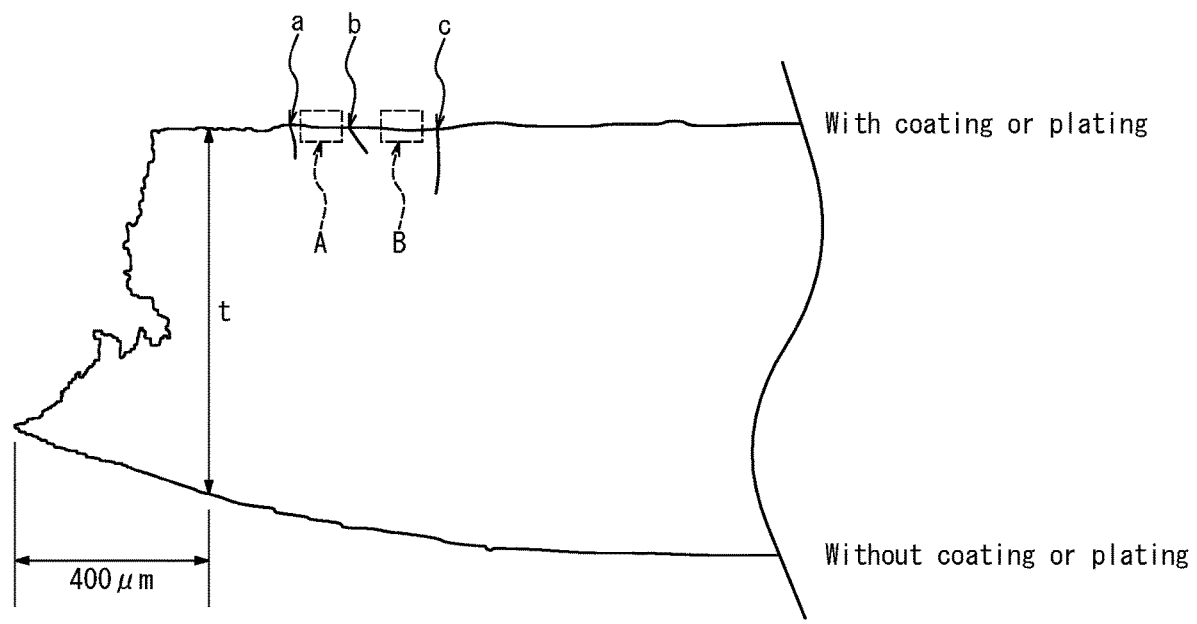

HIGH-STRENGTH STEEL SHEET AND METHOD FOR MANUFACTURING SAME

TECHNICAL FIELD

This disclosure relates to a high-strength steel sheet and a method for manufacturing the same.

BACKGROUND

Attempts have been made to increase the strength and reduce the sheet thickness of steel sheets for automobiles to achieve both the reduction in $CO_2$ emission by reducing the weight of automotive bodies and the improvement in crashworthiness by increasing the strength of automotive bodies. For example, there are more and more cases in which high-strength steel sheets with a tensile strength (TS) of 1180 MPa or more are applied to the main structural parts forming the framework of automobile cabins to increase the strength of automotive bodies.

High-strength steel sheets used for reinforcing parts and framework parts of automobiles are required to have excellent formability. For example, parts such as a crash box have a punched end surface and a bent portion, so that steel sheets having high ductility, stretch flangeability and bendability are suitably used from the viewpoint of formability.

Further, high-strength steel sheets used for reinforcing parts and framework parts of automobiles are required to be able to manufacture parts with high dimensional accuracy. To manufacture parts with high dimensional accuracy, it is important to control the yield ratio (YR=yield stress YS/tensile strength TS) of the steel sheet within a certain range. By controlling the yield ratio (YR) of the steel sheet within a certain range, springback after forming of the steel sheet can be suppressed, and dimensional accuracy during forming can be improved. Furthermore, by increasing the yield ratio (YR) of the steel sheet, the impact absorbed energy of the parts in a crash can be increased.

It is required to develop a high-strength steel sheet that comprehensively satisfies the above characteristics so that the application ratio of high-strength steel sheets to automotive parts can be increased.

Various high-strength steel sheets have been developed for application to automotive parts. For example, JP 2007-302918 A (PTL 1) describes a high-strength steel sheet having a maximum tensile strength (TS) of 590 MPa or more and excellent hole expandability and formability, where, by volume fraction, 40% or more of ferrite and 5% or more of tempered martensite are included, a ratio of the hardness of ferrite (DHTF) to the hardness of martensite (DHTM), which is (DHTM/DHTF), is 1.5 to 3.0, and the residual microstructure consists of ferrite and bainite microstructures, and a method for manufacturing the same.

WO 2016/171237 (PTL 2) describes a coated or plated steel sheet that can improve elongation and bendability while obtaining high strength, which has a microstructure at a position at a depth of ¼ of the thickness of the steel sheet from the surface of the steel sheet including, in volume fraction, 3.0% or more of tempered martensite, 4.0% or more of ferrite, and 5.0% or more of retained austenite, where the average hardness of tempered martensite in a base metal is 5 GPa to 10 GPa, part or all of tempered martensite and retained austenite in the base metal form M-A, the volume fraction of ferrite in a decarburized ferrite layer is 120% or more of the volume fraction of ferrite of the base metal at a position at a depth of ¼ of the thickness of the steel sheet from the surface of the steel sheet, the average grain size of ferrite in a decarburized ferrite layer is 20 µm or less, the thickness of a decarburized ferrite layer is 5 µm to 200 µm, the volume fraction of tempered martensite in a decarburized ferrite layer is 1.0 vol % or more, the number density of tempered martensite in a decarburized ferrite layer is $0.01/µm^2$ or more, and the average hardness of tempered martensite in a decarburized ferrite layer is 8 GPa or less, and a method for manufacturing the same.

Moreover, it has recently been confirmed that during spot welding of a high-strength galvanized steel sheet, zinc in the coating or plating layer diffuses into the crystal grain boundaries of the surface layer of the steel sheet, which causes liquid metal embrittlement (LME) and intergranular cracking (LME cracking). The LME cracking may also occur in a high-strength cold-rolled steel sheet without a galvanized layer if the welding partner is a galvanized steel sheet, so that it has been a problem in all high-strength steel sheets. Therefore, a high-strength steel sheet with excellent LME resistance properties is required when applying high-strength steel sheets to framework parts.

CITATION LIST

Patent Literature

PTL 1: JP 2007-302918 A
PTL 2: WO 2016/171237

SUMMARY

Technical Problem

However, PTL 1 does not mention bendability or LME resistance properties. Further, PTL 2 does not mention stretch flangeability or LME resistance properties. Thus, there is no steel sheet that can comprehensively satisfy strength, ductility, stretch flangeability, bendability and LME resistance properties and that can manufacture parts with high dimensional accuracy.

It could thus be helpful to provide a high-strength steel sheet having a tensile strength of 1180 MPa or more, which is excellent in ductility, stretch flangeability, bendability and LME resistance and is capable of manufacturing parts with high dimensional accuracy, and a method for manufacturing the same.

In the present disclosure, "capable of manufacturing parts with high dimensional accuracy" ("high dimensional accuracy during forming") means that the YR is 65% or more and 90% or less. The YR is determined by the following expression (2).

$$YR = YS/TS \qquad (2)$$

Further, "excellent in ductility" means that the value of total elongation (El), which is an index of ductility, is 14% or more.

"Excellent in stretch flangeability" means that the value of hole expansion ratio ($\lambda$), which is an index of stretch flangeability, is 30% or more.

"Excellent in bendability" means that, when a bending test is performed using the V-block method with a bending angle of 90 degrees and the ridgeline of the tip of a bending test piece is observed under a microscope of 40 times, the value (R/t) of dividing the minimum bend radius (R), at which no crack with a crack length of 200 µm or more is recognized, by the sheet thickness (t) is 2.0 or less.

With respect to the LME resistance properties, a fracture section of a test piece after the high-temperature tensile test described in the Examples section is cut so that a cross section along the sheet thickness direction (L-section) parallel to the rolling direction of the test piece is an observation plane, the cross section along the sheet thickness direction is observed, and the thickness t at a position 400 μm away from the end of the tensile fracture is determined. When the thickness reduction quantity, which is obtained by substituting the thickness t into the following expression (3), is 0.20 or more, it is judged to have excellent LME resistance properties.

$$\text{Thickness reduction} = (t_0 - t)/t_0 \quad (3)$$

where $t_0$ is the initial sheet thickness of the notched tensile test piece before the high-temperature tensile test, and t is the sheet thickness at a distance of 400 μm from the end of the tensile fracture toward the gripping part after the high-temperature tensile test. For example, in the L-section of the fracture section illustrated in FIG. 1, t is determined as illustrated in the FIGURE.

When the value of the thickness reduction is large, that is, when the test piece breaks after the occurrence of a largely compressed part during the high-temperature tensile test, it is judged to have excellent LME resistance properties.

Solution to Problem

As a result of intensive studies, we discovered the following.

(1) By providing a microstructure consisting mainly of tempered martensite, bainite and quenched martensite, which are hard phases, and dispersing retained austenite, a high-strength steel sheet having a tensile strength of 1180 MPa or more with excellent dimensional accuracy of parts and ductility can be realized.

(2) By setting the amount of diffusible hydrogen in a steel sheet to 0.60 mass ppm or less, a high-strength steel sheet having excellent stretch flangeability can be realized.

(3) By reducing the content of Ca and the amount of diffusible hydrogen in a steel sheet and controlling the thickness of softened surface layer to 5 μm or more and 150 μm or less, a high-strength steel sheet having excellent bendability can be realized.

(4) By controlling the frequency of coincidence boundary in the surface layer of a steel sheet after a high-temperature tensile test to 0.45 or less and controlling the thickness of softened surface layer to 5 μm or more and 150 μm or less, a high-strength steel sheet having excellent LME resistance properties can be realized.

The present disclosure is based on these discoveries. We thus provide the following.

[1] A high-strength steel sheet having a tensile strength of 1180 MPa or more, which comprises
a chemical composition containing (consisting of), in mass %,
C: 0.120% or more and 0.250% or less,
Si: 0.80% or more and 2.00% or less,
Mn: more than 2.45% and 4.00% or less,
P: 0.001% or more and 0.100% or less,
S: 0.0200% or less,
Al: 0.010% or more and 1.000% or less, and
N: 0.0100% or less, with
$Mn_{eq}$ obtained with the following expression (1) satisfying a relationship of 3.00% or more and 4.20% or less, and the balance consisting of Fe and inevitable impurities, wherein $Mn_{eq} = 0.26 \times [\% \text{Si}] + [\% \text{Mn}] + 3.5 \times [\% \text{P}] + 2.68 \times [\% \text{Mo}] + 1.29 \times [\% \text{Cr}]$    (1)

where the [% X] in the expression (1) represents a content of element X in mass % in the steel, and the [% X] is 0 when the element X is not contained, and
a steel microstructure wherein
an area ratio of ferrite is 25% or less,
a total area ratio of tempered martensite and bainite is 65% or more and 96% or less,
an area ratio of quenched martensite is 15% or less,
a volume fraction of retained austenite is 4% or more and 20% or less,
an amount of diffusible hydrogen in the steel sheet is 0.60 mass ppm or less,
a thickness of softened surface layer is 5 μm or more and 150 μm or less, and
a frequency of coincidence boundary in a surface layer of the steel sheet after a high-temperature tensile test is 0.45 or less.

[2] The high-strength steel sheet according to [1], wherein a ratio of C-strength of a surface layer to C-strength of a ¼ thickness position of the steel sheet is 0.70 or less.

[3] The high-strength steel sheet according to [1] or [2], wherein the chemical composition further contains, in mass %, at least one selected from the group consisting of
Mo: 0.500% or less,
Cr: 0.300% or less,
Ca: 0.0200% or less,
Sb: 0.200% or less,
Ti: 0.100% or less,
Nb: 0.100% or less,
V: 0.100% or less,
B: 0.0100% or less,
Cu: 1.00% or less,
Ni: 0.50% or less,
Sn: 0.200% or less,
Ta: 0.100% or less,
Mg: 0.0200% or less,
Zn: 0.020% or less,
Co: 0.020% or less,
Zr: 0.020% or less, and
REM: 0.0200% or less.

[4] The high-strength steel sheet according to any one of [1] to [3], which comprises a coating or plating layer on a surface of the steel sheet.

[5] A method for manufacturing a high-strength steel sheet, which comprises
subjecting a steel slab having the chemical composition according to [1] or [3] to hot rolling to obtain a hot-rolled sheet,
then coiling the hot-rolled sheet at a coiling temperature of 350° C. or higher and 600° C. or lower,
then holding the hot-rolled sheet in a temperature range of 300° C. or higher for 5000 seconds or longer, and then cooling the hot-rolled sheet,
then subjecting the hot-rolled sheet to pickling,
then subjecting the hot-rolled sheet to cold rolling under conditions where accumulated rolling reduction in cold rolling is 30% or more and 75% or less to obtain a cold-rolled sheet,
then performing an annealing process, wherein the cold-rolled sheet is heated to a heating temperature of 740° C. or higher and 950° C. or lower in an atmosphere having a dew point of −35° C. or higher, and then cooling the cold-rolled sheet to a cooling stop temperature of 150° C. or higher and 300° C. or lower under conditions where an average cooling rate from the heating temperature to 500° C. is 10° C./s or higher, and then reheating the cold-rolled sheet to a reheating temperature of (cooling stop temperature+50° C.) or higher and 500° C. or lower, and holding the cold-rolled sheet at the reheating temperature for 10 seconds or longer.

[6] The method for manufacturing a high-strength steel sheet according to [5], wherein after the cold rolling and before the annealing process, a preliminary annealing process is performed where the cold-rolled sheet is heated to a heating temperature of 830° C. or higher and cooled under conditions where an average cooling rate from the heating temperature to 500° C. is 5° C./s or higher.

[7] The method for manufacturing a high-strength steel sheet according to [6], wherein after the preliminary annealing process, the cold-rolled sheet is cooled to 50° C. or lower and subjected to rolling at an elongation rate of 0.05% or more and 1.00% or less, and then the annealing process is performed.

Advantageous Effect

According to the present disclosure, it is possible to provide a high-strength steel sheet having a tensile strength of 1180 MPa or more that is excellent in ductility, stretch flangeability, bendability and LME resistance and is capable of manufacturing parts with high dimensional accuracy, and a method for manufacturing the same.

BRIEF DESCRIPTION OF THE DRAWINGS

In the accompanying drawings:

FIG. 1 schematically illustrates the measurement of thickness reduction quantity and the observation position of frequency of coincidence boundary.

DETAILED DESCRIPTION

The following describes an embodiment of the present disclosure. Note that the present disclosure is not limited to the following embodiment. First, a proper range of the chemical composition of the steel sheet and reasons for its limitation will be explained. In the following description, the "%" representations indicating the content of the component element of the steel sheet are in "mass %" unless otherwise specified.

C: 0.120% or more and 0.250% or less

C is an element effective in forming a predetermined amount of hard phases of tempered martensite, bainite, and quenched martensite, as well as retained austenite to obtain a TS of 1180 MPa or more and excellent dimensional accuracy during forming. When the C content is less than 0.120%, the area ratio of ferrite increases, and the total area ratio of tempered martensite and bainite decreases, rendering it difficult to obtain a TS of 1180 MPa or more. On the other hand, when the C content exceeds 0.250%, the carbon concentration in retained austenite excessively increases, and the hardness of the martensite formed from retained austenite during blanking significantly increases. As a result, the growth of cracks is accelerated during hole expansion, and the stretch flangeability is deteriorated. The bendability is also deteriorated. Therefore, the C content is set to 0.120% or more and 0.250% or less. The C content is preferably 0.140% or more and more preferably 0.150% or more. The C content is preferably 0.230% or less and more preferably 0.220% or less.

Si: 0.80% or more and 2.00% or less

Si is an element that affects the volume fraction of retained austenite and the carbon concentration in retained austenite by suppressing the formation of carbides during annealing and promoting the formation of retained austenite. Further, reducing the Si content can reduce the frequency of coincidence boundary in the surface layer of the steel sheet and improve the LME resistance properties. When the Si content is less than 0.80%, the volume fraction of retained austenite decreases, and the ductility deteriorates. On the other hand, if the Si content exceeds 2.00%, twinning occurs in the austenite microstructure of the surface layer of the steel sheet when the microstructure of the surface layer of the steel sheet is austenitized during a high-temperature tensile test, that is, the frequency of coincidence boundary increases, so that the LME resistance properties deteriorate. Therefore, the Si content is set to 0.80% or more and 2.00% or less. The Si content is preferably 0.90% or more and more preferably 1.00% or more. The Si content is preferably 1.80% or less and more preferably 1.70% or less.

Mn: more than 2.45% and 4.00% or less

Mn is one of the important basic components of steel, and especially in the present disclosure, it is an important element that affects the area ratio of hard phase. When the Mn content is less than 2.45%, the area ratio of ferrite increases, and the total area ratio of tempered martensite and bainite decreases, rendering it difficult to obtain a TS of 1180 MPa or more. The YR also decreases. On the other hand, when the Mn content exceeds 4.00%, the area ratio of quenched martensite increases, and the stretch flangeability and the bendability deteriorate. Therefore, the Mn content is set to more than 2.45% and less than 4.00%. The Mn content is preferably 2.50% or more and more preferably 2.55% or more. The Mn content is preferably 3.50% or less and more preferably 3.00% or less.

P: 0.001% or more and 0.100% or less

P is an element that has the effect of solid solution strengthening and can increase the strength of the steel sheet. To obtain these effects, the P content is set to 0.001% or more. On the other hand, when the P content exceeds 0.100%, it segregates in prior austenite grain boundaries and embrittles the grain boundaries, which increases the number of voids formed after blanking and deteriorates the stretch flangeability. The bendability is also deteriorated. Therefore, the P content is set to 0.001% or more and 0.100% or less. The P content is preferably 0.002% or more and more preferably 0.003% or more. The P content is preferably 0.050% or less and more preferably 0.030% or less.

S: 0.0200% or less

S exists as sulfides in steel. When the S content exceeds 0.0200%, the ultimate deformability of the steel sheet is deteriorated. As a result, the number of voids formed after blanking increases, and the stretch flangeability deteriorates. The bendability also deteriorates. Therefore, the S content is set to 0.0200% or less. Although the lower limit of the S content is not specified, the S content is preferably 0.0001% or more considering the restrictions on manufacturing technologies. The S content is preferably 0.0040% or less.

Al: 0.010% or more and 1.000% or less

Al is an element that suppresses the formation of carbides during annealing and promotes the formation of retained austenite, thereby affecting the volume fraction of retained austenite and the carbon concentration in retained austenite. To obtain these effects, the Al content is set to 0.010% or more. On the other hand, when the Al content exceeds 1.000%, a large amount of ferrite is formed, and the dimensional accuracy during forming is decreased. Therefore, the Al content is set to 0.010% or more and 1.000% or less. The Al content is preferably 0.015% or more and more preferably 0.020% or more. The Al content is preferably 0.100% or less and more preferably 0.070% or less.

N: 0.0100% or less

N exists as nitrides in steel. When the N content exceeds 0.0100%, the ultimate deformability of the steel sheet is deteriorated. As a result, the number of voids formed after blanking increases, and the stretch flangeability deteriorates. The bendability also deteriorates. Therefore, the N content is set to 0.0100% or less. Although the lower limit of the N content is not specified, the N content is preferably 0.0005% or more considering the restrictions on manufacturing technologies. The N content is preferably 0.0050% or less.

$Mn_{eq}$: 3.00% or more and 4.20% or less

This is an extremely important feature of the present disclosure. $Mn_{eq}$ is a parameter in obtaining a TS of 1180 MPa or more by increasing the hardenability, obtaining excellent dimensional accuracy during forming, and obtaining excellent ductility. When the $Mn_{eq}$ is less than 3.00%, the area ratio of ferrite increases, and the total area ratio of tempered martensite and bainite decreases, rendering it difficult to obtain a TS of 1180 MPa or more. The YR also decreases. On the other hand, when the $Mn_{eq}$ exceeds 4.20%, the area ratio of quenched martensite increases, the amount of diffusible hydrogen in the steel sheet increases, and the stretch flangeability and the bendability deteriorate. Further, the YR decreases, and excellent dimensional accuracy during forming cannot be obtained. Therefore, the $Mn_{eq}$ is set to 3.00% or more and 4.20% or less. The $Mn_{eq}$ is preferably 3.10% or more and more preferably 3.20% or more. The $Mn_{eq}$ is preferably 4.10% or less and more preferably 3.90% or less.

As used herein, the $Mn_{eq}$ is calculated with the following expression (1), $$Mn_{eq}=0.26\times[\% \text{ Si}]+[\% \text{ Mn}]+3.5\times[\% \text{ P}]+2.68\times[\% \text{ Mo}]+1.29\times[\% \text{ Cr}] \quad (1)$$

where the [% X] in the expression (1) represents the content (mass %) of the element X in the steel, and the [% X] is 0 if the element X is not contained.

[Optional Component]

In addition to the chemical composition described above, the high-strength steel sheet of the present disclosure preferably further contains, in mass %, at least one selected from the group consisting of Mo: 0.500% or less, Cr: 0.300% or less, Ca: 0.0200% or less, Sb: 0.200% or less, Ti: 0.100% or less, Nb: 0.100% or less, V: 0.100% or less, B: 0.0100% or less, Cu: 1.00% or less, Ni: 0.50% or less, Sn: 0.200% or less, Ta: 0.100% or less, Mg: 0.0200% or less, Zn: 0.020% or less, Co: 0.020% or less, Zr: 0.020% or less, and REM: 0.0200% or less, where these elements may be contained along or in combination.

Mo: 0.500% or less

Mo is an element that improves the hardenability, and it is an element effective in forming hard phases. When the Mo content exceeds 0.500%, the area ratio of quenched martensite increases, and the stretch flangeability and the bendability deteriorate. Therefore, the Mo content is set to 0.500% or less. The lower limit of the Mo content may be 0.000%. However, from the viewpoint of increasing the hardenability and obtaining a TS within a more suitable range, the Mo content is preferably 0.010% or more. The Mo content is preferably 0.450% or less and more preferably 0.400% or less. The Mo content is more preferably 0.030% or more.

Cr: 0.300% or less

Cr is an element that improves the hardenability, and it is an element effective in forming hard phases. When the Cr content exceeds 0.300%, the area ratio of quenched martensite increases, and the stretch flangeability and the bendability deteriorate. Therefore, the Cr content is set to 0.300% or less. The lower limit of the Cr content may be 0.000%. However, from the viewpoint of increasing the hardenability and obtaining a TS within a more suitable range, the Cr content is preferably 0.010% or more. The Cr content is preferably 0.250% or less and more preferably 0.100% or less.

Ca: 0.0200% or less

Ca exists as inclusions in steel. When the Ca content exceeds 0.0200%, if diffusible hydrogen is contained in the steel sheet, the inclusions serve as starting points of cracks in a bending test, which deteriorates the bendability. Therefore, the Ca content is set to 0.0200% or less. Although the lower limit of the Ca content may be 0.0000%, the Ca content is preferably 0.0001% or more considering the restrictions on manufacturing technologies. The Ca content is preferably 0.0020% or less.

Sb: 0.200% or less

Sb is an element effective in suppressing oxidation on the surface of the steel sheet during annealing and controlling the thickness of softened surface layer. When the Sb content exceeds 0.200%, a softened layer cannot be formed on the surface layer, so that the bendability deteriorates. Further, a ratio of the C-strength of the surface layer to the C-strength of a ¼ thickness position of the steel sheet increases, and the frequency of coincidence boundary in the surface layer of the steel sheet increases during a high-temperature tensile test. As a result, the LME resistance properties deteriorate. Therefore, the Sb content is set to 0.200% or less. Although the lower limit of the Sb content may be 0.000%, the Sb content is preferably 0.001% or more from the viewpoint of controlling the thickness of softened surface layer and obtaining a TS within a more suitable range. The Sb content is more preferably 0.002% or more and even more preferably 0.005% or more. The Sb content is preferably 0.050% or less and more preferably 0.020% or less.

Ti, Nb and V increase the TS by forming fine carbides, nitrides or carbonitrides during hot rolling or annealing. To obtain these effects, the content of each of at least one of Ti, Nb and V is set to 0.001% or more. On the other hand, when the content of each of at least one of Ti, Nb and V exceeds 0.100%, a large amount of coarse precipitates and inclusions are formed, and if diffusible hydrogen is contained in the steel sheet, they serve as starting points of cracks in a bending test, which deteriorates the bendability. Therefore, when at least one of Ti, Nb and V is added, the content of each is set to 0.100% or less. When at least one of Ti, Nb and V is added, the content of each is preferably 0.005% or more. When at least one of Ti, Nb and V is added, the content of each is preferably 0.060% or less. When at least one of Ti, Nb and V is added, the content of each is more preferably 0.010% or more.

B is an element that can improve the hardenability by segregating at austenite grain boundaries, and the addition of B to the steel can suppress the formation of ferrite and the growth of grains during annealing and cooling. To obtain these effects, the B content is preferably 0.0001% or more. On the other hand, when the B content exceeds 0.0100%, cracking occurs inside the steel sheet during hot rolling, which deteriorates the ultimate deformability of the steel sheet. As a result, the total void number density increases after blanking, and the stretch flangeability deteriorates. The bendability also deteriorates. Therefore, when B is added, its content is set to 0.0100% or less. When B is added, its content is more preferably 0.0002% or more. When B is added, its content is preferably 0.0050% or less.

Cu is an element that increases the hardenability, and it is an element effective in making the area ratio of hard phase within a more suitable range, in making the TS within a more suitable range, and in further improving the dimensional accuracy during forming. To obtain these effects, the Cu content is preferably 0.01% or more. On the other hand, when the Cu content exceeds 1.00%, the area ratio of hard phase increases, and the dimensional accuracy during forming and the ductility deteriorate. In addition, coarse precipitates and inclusions increase, and if diffusible hydrogen is contained in the steel sheet, they serve as starting points of cracks in a bending test, which deteriorates the bendability. Therefore, when Cu is added, its content is set to 1.00% or less. When Cu is added, its content is more preferably 0.02% or more. When Cu is added, its content is preferably 0.20% or less.

Ni is an element that increases the hardenability, and it is an element effective in making the area ratio of hard phase within a more suitable range, in making the TS within a more suitable range, and in further improving the dimensional accuracy during forming. To obtain these effects, the Ni content is preferably 0.01% or more. On the other hand, when the Ni content exceeds 0.50%, the area ratio of hard phase increases, and the dimensional accuracy during forming and the ductility deteriorate. In addition, coarse precipitates and inclusions increase, and if diffusible hydrogen is contained in the steel sheet, they serve as starting points of cracks in a bending test, which deteriorates the bendability. Therefore, when Ni is added, its content is set to 0.50% or less. When Ni is added, its content is more preferably 0.02% or more. When Ni is added, its content is preferably 0.20% or less.

Sn is an element effective in suppressing oxidation on the surface of the steel sheet during annealing and more suitably controlling the thickness of softened surface layer. To obtain these effects, the Sn content is preferably 0.001% or more. On the other hand, when the Sn content exceeds 0.200%, coarse precipitates and inclusions increase, and if diffusible hydrogen is contained in the steel sheet, the precipitates and inclusions serve as starting points of cracks in a bending test, which deteriorates the bendability. Therefore, when Sn is added, its content is set to 0.200% or less. When Sn is added, its content is more preferably 0.005% or more. When Sn is added, its content is preferably 0.050% or less.

Ta, as well as Ti, Nb and V, increases the TS by forming fine carbides, nitrides or carbonitrides during hot rolling or annealing. It is also believed that Ta has the effect of significantly suppressing coarsening of precipitates when partially dissolved in Nb carbides or Nb carbonitrides to form complex precipitates, such as (Nb, Ta) (C, N), and improving the strength of the steel sheet by stabilizing the strengthening by precipitation. To obtain these effects, the Ta content is preferably 0.001% or more. On the other hand, when the Ta content exceeds 0.100%, a large amount of coarse precipitates and inclusions are formed, and if diffusible hydrogen is contained in the steel sheet, the precipitates and inclusions serve as starting points of cracks in a bending test, which deteriorates the bendability. Therefore, when Ta is added, its content is set to 0.100% or less. When Ta is added, its content is preferably 0.005% or more. When Ta is added, its content is preferably 0.050% or less.

Mg is an element effective in spheroidizing the shape of inclusions such as sulfides and oxides, improving the ultimate deformability of the steel sheet, and improving the stretch flangeability. To obtain these effects, the Mg content is preferably 0.0001% or more. On the other hand, when the Mg content exceeds 0.0200%, a large amount of coarse precipitates and inclusions are formed, and if diffusible hydrogen is contained in the steel sheet, the precipitates and inclusions serve as starting points of cracks in a bending test, which deteriorates the bendability. Therefore, when Mg is added, its content is set to 0.0200% or less. When Mg is added, its content is preferably 0.0005% or more. When Mg is added, its content is preferably 0.0050% or less.

Zn, Co, and Zr are all elements effective in spheroidizing the shape of inclusions, improving the ultimate deformability of the steel sheet, and improving the stretch flangeability. To obtain these effects, the content of each of at least one of Zn, Co and Zr is preferably 0.001% or more. On the other hand, when the content of each of at least one of Zn, Co and Zr exceeds 0.020%, a large amount of coarse precipitates and inclusions are formed, and if diffusible hydrogen is contained in the steel sheet, the precipitates and inclusions serve as starting points of cracks in a bending test, which deteriorates the bendability. Therefore, when at least one of Zn, Co and Zr is added, the content of each of at least one of Zn, Co and Zr is set to 0.020% or less. When at least one of Zn, Co and Zr is added, the content of each of at least one of Zn, Co and Zr is preferably 0.002% or more. When at least one of Zn, Co and Zr is added, the content of each of at least one of Zn, Co and Zr is preferably 0.010% or less.

REM is an element effective in spheroidizing the shape of inclusions, improving the ultimate deformability of the steel sheet, and improving the stretch flangeability. To obtain these effects, the REM content is preferably 0.0001% or more. On the other hand, when the REM content exceeds 0.0200%, a large amount of coarse precipitates and inclusions are formed, and if diffusible hydrogen is contained in the steel sheet, the precipitates and inclusions serve as starting points of cracks in a bending test, which deteriorates the bendability. Therefore, when REM is added, its content is set to 0.0200% or less. When REM is added, its content is preferably 0.0005% or more. When REM is added, its content is preferably 0.0100% or less.

The balance other than the above-described components is Fe and inevitable impurities. Note that for the above-described optional components, the effect of the present disclosure will not be impaired when their contents are less than the preferred lower limits described above. Therefore, when these optional components are contained in an amount less than the lower limit, they are taken as inevitable impurities.

Next, the steel microstructure of the high-strength steel sheet of the present disclosure will be described.

Area ratio of ferrite: 25% or less

By setting the area ratio of ferrite to 25% or less, the YR can be controlled within the desired range, and excellent dimensional accuracy can be obtained during forming. On the other hand, when the area ratio of ferrite exceeds 25%, the YR decreases, and excellent dimensional accuracy cannot be obtained during forming. Further, the hardness difference between ferrite, which is a soft phase, and quenched martensite, which is a hard phase, increases, resulting in deterioration in stretch flangeability and bendability. Although the effect of the present disclosure can be obtained even if the area ratio of ferrite is 0%, it is preferable to set the area ratio of ferrite to 1% or more in order to further improve the ductility. Therefore, the area ratio of ferrite is set to 25% or less. The area ratio of ferrite is preferably 1% or more and more preferably 2% or more. The area ratio of ferrite is preferably 22% or less and more preferably 16% or less. The observation position of the area ratio of ferrite is a ¼ thickness position of the steel sheet as described below.

Total area ratio of tempered martensite and bainite: 65% or more and 96% or less Tempered martensite and bainite are phases having a hardness intermediate between that of ferrite, which is a soft phase, and that of quenched martensite, which is a hard phase. By setting the total area ratio of tempered martensite and bainite to 65% or more, the amount of diffusible hydrogen in the steel sheet can be reduced, and the stretch flangeability and the bendability can be improved. In addition, by containing 65% or more of tempered martensite and bainite, the YR can be controlled within the desired range, and excellent dimensional accuracy can be obtained during forming. On the other hand, when the total area ratio of tempered martensite and bainite exceeds 96%, the YR increases, and excellent dimensional accuracy cannot be obtained during forming. It is also difficult to achieve a TS of 1180 MPa or more. Therefore, the area ratio of tempered martensite is set to 65% or more and 96% or less. The area ratio of tempered martensite is preferably 68% or more, more preferably 71% or more, and even more preferably 75% or more. The area ratio of tempered martensite is preferably 95% or less, more preferably 90% or less, and even more preferably 84% or less. The observation position of the area ratio of tempered martensite is a ¼ thickness position of the steel sheet as described below.

Area ratio of quenched martensite: 15% or less

By setting the area ratio of quenched martensite to 15% or less, the YR can be controlled within the desired range, and excellent dimensional accuracy can be obtained during forming. In addition, the amount of diffusible hydrogen in the steel sheet can be reduced, and the stretch flangeability and the bendability can be improved. On the other hand, when the area ratio of quenched martensite exceeds 15%, the YR decreases, and excellent dimensional accuracy cannot be obtained during forming. In addition, the amount of diffusible hydrogen in the steel sheet increases, and the stretch flangeability and the bendability deteriorate. Although the effect of the present disclosure can be obtained even if the area ratio of quenched martensite is 0%, it is preferable to set the area ratio of quenched martensite to 1% or more so that the YR can be controlled within the desired range. Therefore, the area ratio of quenched martensite is set to 15% or less. The area ratio of quenched martensite is preferably 1% or more and more preferably 2% or more. The area ratio of quenched martensite is preferably 10% or less and more preferably 6% or less. The observation position of the area ratio of quenched martensite is a ¼ thickness position of the steel sheet as described below.

As used herein, the area ratios of ferrite, tempered martensite, bainite, and quenched martensite are measured as follows. A sample is cut out so that a cross section along the sheet thickness direction (L-section) parallel to the rolling direction of the steel sheet is an observation plane, then the observation plane is subjected to mirror polishing using diamond paste, followed by finish polishing using colloidal silica, and then the observation plane is etched with 3 vol % nital to reveal the microstructure. Using a scanning electron microscope (SEM) equipped with an InLens detector at an accelerating voltage of 1 kV, three locations of 17 μm×23 μm are observed at a magnification of 5000 times, with a ¼ thickness position of the steel sheet as the observation position. Using the obtained microstructure images and Adobe Photoshop of Adobe Systems, the area of each microstructure (ferrite, tempered martensite and bainite, and quenched martensite) is divided by the measured area to obtain an area ratio, the area ratios of the three locations are calculated, and these values are averaged to obtain an area ratio of each microstructure. In the microstructure images, ferrite is a concave microstructure and a flat microstructure that contains no carbides, tempered martensite and bainite are concave microstructures that contain fine carbides, and quenched martensite is a convex portion and a microstructure with fine irregularities inside the microstructure, which can be distinguished from each other. Note that the tempered martensite and the bainite do not have to be distinguished from each other, because it is their total area ratio that is determined.

Volume fraction of retained austenite: 4% or more and 20% or less

By containing 4% or more of retained austenite, excellent ductility can be obtained. On the other hand, when the volume fraction of retained austenite exceeds 20%, voids are formed inside martensite when martensite transformation occurs due to the working during blanking or in a bending test, because retained austenite has a high hydrogen concentration. Therefore, the number of voids formed after blanking increases, and the stretch flangeability deteriorates. The bendability also deteriorates because the voids formed inside martensite serve as starting points of cracks in a bending test. Therefore, the volume fraction of retained austenite is set to 4% or more and 20% or less. The volume fraction of retained austenite is preferably 5% or more and more preferably 6% or more. The volume fraction of retained austenite is preferably 18% or less and more preferably 14% or less.

As used herein, the volume fraction of retained austenite is measured as follows. The steel sheet is subjected to mechanical grinding in the thickness direction (depth direction) to ¼ of the sheet thickness and then to chemical polishing with oxalic acid to obtain an observation plane. The observation plane is observed with X-ray diffraction method. Using a CoKa source as an incident X-ray, a ratio of the diffraction intensity of each of (200), (220) and (311) planes of fcc iron (austenite) to the diffraction intensity of each of (200), (211), and (220) planes of bcc iron is determined and taken as the volume fraction of retained austenite.

In addition to the ferrite, tempered martensite, bainite, quenched martensite, and retained austenite described above, the steel microstructure according to the present disclosure may contain carbides such as pearlite and cementite and other known microstructures of steel sheet, and the effect of the present disclosure will not be impaired if their total area ratio is in a range of 8% or less. The other microstructures (residual microstructure) of the steel sheet can be confirmed and determined by, for example, SEM observation.

Amount of diffusible hydrogen in steel sheet: 0.60 mass ppm or less

This is an extremely important feature of the present disclosure. As a result of diligent study on realizing a high-strength steel sheet with excellent stretch flangeability, we found that the amount of diffusible hydrogen in the steel sheet is related to stretch flangeability and bendability. As a result of further investigation, we found that excellent stretch flangeability and bendability can be obtained by reducing the amount of diffusible hydrogen in the steel sheet to 0.60 mass ppm or less, thereby completing the present disclosure. Although the lower limit of the amount of diffusible hydrogen in the steel sheet is not specified, the amount of diffusible hydrogen in the steel sheet is preferably 0.01 mass ppm or more considering the restrictions on manufacturing technologies. The amount of diffusible hydrogen in the steel sheet is more preferably 0.05 mass ppm or more. The amount of diffusible hydrogen in the steel sheet is preferably 0.50 mass ppm or less and more preferably 0.45 mass ppm or less. The steel sheet whose amount of diffusible hydrogen is to be measured may be a high-strength steel sheet before coating or plating treatment, or a base steel sheet of a high-strength coated or plated steel sheet after coating or plating treatment and before working. It may also be a base steel sheet of a steel sheet that has been subjected to working such as blanking, stretch flange forming and bending after coating or plating treatment, or a base metal part of a product manufactured by welding a worked steel sheet.

As used herein, the amount of diffusible hydrogen in the steel sheet is measured as follows. When the steel sheet is a high-strength steel sheet without a coating or plating layer, a test piece with a length of 30 mm and a width of 5 mm is collected. When the steel sheet is a high-strength hot-dip galvanized steel sheet, a test piece with a length of 30 mm and a width of 5 mm is collected, and the hot-dip galvanized layer or the galvannealed layer is removed with alkali. After that, the amount of hydrogen released from the test piece is measured with a method of raising temperature, desorbing, and analyzing. Specifically, the test piece is continuously heated from room temperature to 300° C. at a heating rate of 200° C./h and then cooled to room temperature, and the accumulated amount of hydrogen released from the test piece from room temperature to 210° C. is measured to determine the amount of diffusible hydrogen in the steel sheet.

Thickness of softened surface layer: 5 μm or more and 150 μm or less

By making the surface layer of the steel sheet softer than the ¼ thickness position, excellent bendability and LME resistance properties can be obtained. To obtain these effects, the thickness of a softened layer of the surface layer (thickness of softened surface layer) is set to 5 μm or more. On the other hand, the thickness of softened surface layer is set to 150 μm or less in order to obtain a TS of 1180 MPa or more. Therefore, the thickness of softened surface layer is set to 5 μm or more and 150 μm or less. The thickness of softened surface layer is preferably 10 μm or more and more preferably 15 μm or more. The thickness of softened surface layer is preferably 130 μm or less, more preferably 110 μm or less, and even more preferably 80 μm or less.

As used herein, the thickness of softened surface layer is measured as follows.

A cross section along the sheet thickness direction (L-section) parallel to the rolling direction of the steel sheet is smoothed by wet polishing, and then measurement is performed using a Vickers hardness tester at 5 μm intervals from a position of 5 μm in the sheet thickness direction to a position of 100 μm in the sheet thickness direction from the sheet thickness surface at a load of 10 gf. Thereafter, measurement is performed at 20 μm intervals to the middle of the sheet thickness. An area where the hardness is reduced to 95% or less of the hardness of the ¼ thickness position is defined as a softened area, and the thickness in the thickness direction from the surface layer of the steel sheet to the softened area is defined as the thickness of softened surface layer.

Frequency of coincidence boundary in surface layer of steel sheet after high-temperature tensile test: 0.45 or less This is an extremely important feature of the present disclosure. By reducing the frequency of coincidence boundary in the surface layer of the steel sheet after a high-temperature tensile test to 0.45 or less, the number of coincidence boundaries where LME cracking preferentially develops can be reduced, and excellent LME resistance properties can be obtained. The lower limit of the frequency of coincidence boundary in the surface layer of the steel sheet after a high-temperature tensile test is not specified, but the frequency of coincidence boundary in the surface layer of the steel sheet after a high-temperature tensile test is generally 0.05 or more. The frequency of coincidence boundary in the surface layer of the steel sheet after a high-temperature tensile test is preferably 0.15 or more. The frequency of coincidence boundary in the surface layer of the steel sheet after a high-temperature tensile test is preferably 0.41 or less and more preferably 0.35 or less.

As used herein, the frequency of coincidence boundary in the surface layer of the steel sheet after a high-temperature tensile test is calculated as follows.

A sample for measuring the frequency of coincidence boundary is collected by cutting so that the sample includes a fractured part of a test piece after the high-temperature tensile test described in the Examples section and that a cross section along the sheet thickness direction (L-section) parallel to the tensile direction of the test piece is an observation plane. Next, the cross section along the sheet thickness direction of the sample for measuring the frequency of coincidence boundary is smoothed by buff polishing using diamond paste and alumina paste, and then the processed layer is completely removed by ion milling. Next, if the test steel is a cold-rolled sheet, the crystal orientation of the surface layer of the steel sheet on the side that is joined to a coated or plated steel sheet is measured using FE-SEM/EBSD (JSM7100F: manufactured by JEOL Ltd.; OIM: manufactured by TSL Corporation), and if the test steel is a coated or plated steel sheet, the crystal orientation of the surface layer of the steel sheet on the coated or plated layer side is measured using FE-SEM/EBSD. The EBSD measurement is performed under measurement conditions that are sufficient to evaluate the substructure of martensite in terms of crystal orientation (observation position: near a zone where LME cracking occurs, field of view for measurement: 60 μm (tensile direction)×40 μm (cracking growth direction), interval between measurement points: 40 nm). As used herein, "near a zone where LME cracking occurs" refers to an area in the middle of multiple cracks (LME cracks) formed on the surface of the steel sheet after the high-temperature tensile test. In the example illustrated in FIG. 1, Area A between cracks a and b and Area B between cracks b and c are near a zone where LME cracking occurs, respectively. Note that when there are multiple areas near a zone where LME cracking occurs as illustrated in the example of FIG. 1, the frequency of coincidence boundary may be observed at any of the areas. The obtained EBSD observation results are used to investigate the character of all grain boundaries in the surface layer of the steel sheet in the field of view for measurement. Next, the frequency of coincidence boundary in the surface layer of the steel sheet is calculated by the following expression, using the number of grain boundaries with a coincidence boundary relationship in the surface layer of the steel sheet in the field of view for measurement and the total number of grain boundaries in the surface layer of the steel sheet in the field of view for measurement.

[Frequency of coincidence boundary in the surface layer of the steel sheet after a high-temperature tensile test]=[Number of grain boundaries with a coincidence boundary relationship in the surface layer of the steel sheet in the field of view for measurement]/[Total number of grain boundaries in the surface layer of the steel sheet in the field of view for measurement]

As used herein, the coincidence boundary is defined as a low-ECSL (coincident site lattice) grain boundary of Σ23 or less.

Ratio of C-strength of surface layer of steel sheet to C-strength of ¼ thickness position of steel sheet: 0.70 or less The ratio of the C-strength of the surface layer of the steel sheet to the C-strength of the ¼ thickness position of the steel sheet is preferably 0.70 or less. The ratio of the C-strength of the surface layer of the steel sheet to the C-strength of the ¼ thickness position of the steel sheet is expressed by the following expression.

[Ratio of the C-strength of the surface layer to the C-strength of the ¼ thickness position of the steel sheet]=[C-strength of the surface layer of the steel sheet]/[C-strength of the ¼ thickness position of the steel sheet]

By controlling the rolling reduction of the final pass of cold rolling and the rolling reduction of the pass immediately before the final pass as described below, and by controlling the dew point of the atmosphere at the heating temperature when the cold-rolled sheet is heated as described below, the ratio of the C-strength of the surface layer of the steel sheet to the C-strength of the ¼ thickness position of the steel sheet can be controlled to 0.70 or less, thereby further improving the bendability and the LME resistance properties. By setting the ratio of the C-strength of the surface layer of the steel sheet to the C-strength of the ¼ thickness position of the steel sheet to 0.70 or less, the amount of C in the surface of the steel sheet can be prevented from increasing, and twinning can be suitably prevented from occurring in the austenite microstructure of the surface layer of the steel sheet as the microstructure of the surface layer of the steel sheet is austenitized during the heating in a high-temperature tensile test. As a result, the LME resistance properties can be further improved. Further, the surface layer of the steel sheet can be more suitably softened, so that the bendability can be further improved. The lower limit of the ratio of the C-strength of the surface layer of the steel sheet to the C-strength of the ¼ thickness position of the steel sheet is not specified. However, the ratio of the C-strength of the surface layer of the steel sheet to the C-strength of the ¼ thickness position of the steel sheet is preferably 0.05 or more to obtain a TS within a suitable range. Therefore, the ratio of the C-strength of the surface layer of the steel sheet to the C-strength of the ¼ thickness position of the steel sheet is preferably 0.70 or less. The ratio of the C-strength of the surface layer of the steel sheet to the C-strength of the ¼ thickness position of the steel sheet is more preferably 0.50 or less and even more preferably 0.40 or less. The ratio of the C-strength of the surface layer of the steel sheet to the C-strength of the ¼ thickness position of the steel sheet is preferably 0.05 or more and more preferably 0.10 or more.

As used herein, the C-strength of the surface layer of the steel sheet and the C-strength of the ¼ thickness position of the steel sheet are calculated as follows. A test piece with a length of 20 mm and a width of 20 mm is collected from the steel sheet. Glow discharge spectroscopy (GDS) is used to analyze the test piece for measurement from the surface layer of the steel sheet in the depth direction. As used herein, the C-strength of the surface layer of the steel sheet and the C-strength of the ¼ thickness position of the steel sheet are the C-strength in an area where the measurement time from the surface of the steel sheet is 100 seconds and the C-strength in an area where the measurement time from the surface of the steel sheet is 1100 seconds, respectively, both measured by GDS. The GDS system is GDA750 manufactured by Rigaku Corporation, and the measurement conditions are as follows.

Measurement mode: high-frequency mode
Electrode size: φ4 [mm]
High-frequency voltage: 600 [V]
Ar gas pressure: 2.8 [hPa]

The high-strength steel sheet of the present disclosure has a tensile strength (TS) of 1180 MPa or more.

The TS is measured in accordance with JIS Z 2241 as follows. A JIS No. 5 test piece is collected from the high-strength steel sheet so that the longitudinal direction is perpendicular to the rolling direction of the steel sheet. Using the test piece, a tensile test is performed under the condition of a crosshead displacement speed Vc of $1.67 \times 10^{-1}$ mm/s to measure the TS.

The high-strength steel sheet of the present disclosure may have a coating or plating layer on its surface. The composition of the coating or plating layer is not specified and may be a common composition. The coating or plating layer may be formed with any method, and it may be a hot-dip coating layer or an electroplated layer, for example. The coating or plating layer may also be alloyed.

The coating or plating layer is preferably a hot-dip galvanized layer. The composition of the hot-dip galvanized layer is not specified. In one example, the coating or plating layer has a composition containing 20 mass % or less of Fe and 0.001 mass % or more and 1.0 mass % or less of Al and further containing at least one selected from the group consisting of Pb, Sb, Si, Sn, Mg, Mn, Ni, Cr, Co, Ca, Cu, Li, Ti, Be, Bi, and REM in a total amount of 0 mass % or more and 3.5 mass % or less, with the balance consisting of Zn and inevitable impurities. In a case where the coating or plating layer is a hot-dip galvanized layer, the Fe content in the coating or plating layer is less than 7 mass %. In a case where the coating or plating layer is a galvannealed layer, the Fe content in the coating or plating layer is 7 mass % or more and 15 mass % or less, the Fe content is more preferably 8 mass % or more, and the Fe content is more preferably 13 mass % or less.

The coating or plating layer is preferably hot-dip zinc-aluminum-magnesium alloy coating (Zn—Al—Mg coating layer). Although the composition of the Zn—Al—Mg coating layer is not specified, it is preferable to have a composition containing 1 mass % or more and 22 mass % or less of Al and 0.1 mass % or more and 10 mass % or less of Mg, with the balance consisting of Zn and inevitable impurities. In addition to Zn, Al, and Mg, the Zn—Al—Mg coating layer may also contain at least one selected from the group consisting of Si, Ni, Ce and La at a total amount of 1 mass % or less. The coating or plating layer may be mainly made of any metal. For example, it may be an Al coating or plating layer or the like.

Although the weight of coating or plating is not specified, the weight of coating or plating for one side of the steel sheet is preferably 20 g/m² or more and 80 g/m² or less.

The coating or plating layer preferably has a crack. When the coating or plating layer has a crack, the amount of diffusible hydrogen in the steel sheet can be reduced to a more suitable range. As a result, the stretch flangeability and the bendability can be improved.

As used herein, whether the coating or plating layer has a crack or not is determined as follows. The coating or plating layer formed on the surface of the steel sheet is observed under SEM at a magnification of 1500 times for a total of four locations, with two locations for each of the front and back surfaces of the steel sheet. When one or more cracks with a length of 10 μm or more is in any of the four locations, it is determined to have a crack.

The sheet thickness of the high-strength steel sheet of the present disclosure is not specified, but it is usually 0.3 mm or more and 2.8 mm or less.

Next, a method for manufacturing the high-strength steel sheet of the present disclosure will be described. For the method for manufacturing the high-strength thin steel sheet, each temperature range is for the surface temperature of a steel slab or steel sheet, unless otherwise specified.

First, a steel slab having the chemical composition described above is produced. First, steel materials are melted to obtain molten steel having the chemical composition described above. The melting method is not specified, and any known melting method such as converter melting or electric furnace melting may be suitably used. The resulting molten steel is solidified to produce a steel slab (slab). The method for producing a steel slab from molten steel is not specified, and continuous casting, ingot casting, thin slab casting or the like may be used. It is preferable to produce the steel slab by continuous casting to prevent macro segregation.

Next, the produced steel slab is subjected to hot rolling including rough rolling and finishing rolling to obtain a hot-rolled sheet. In one example, the steel slab thus produced is once cooled to room temperature and then subjected to slab heating followed by rolling. The slab heating temperature is preferably 1100° C. or higher from the viewpoint of dissolution of carbides and reduction of rolling load. The slab heating temperature is preferably 1300° C. or lower to prevent an increase in scale loss. The slab heating temperature is based on the temperature of the slab surface during heating.

Alternatively, the hot rolling may be performed with what is called "energy-saving" processes. Examples of the "energy-saving" processes include direct rolling in which the produced steel slab without being fully cooled to room temperature is charged into a heating furnace as a warm slab to be hot rolled, and direct rolling in which the produced steel slab undergoes heat retaining for a short period and then immediately subjected to rolling.

Next, the steel slab is subjected to rough rolling under normal conditions to obtain a sheet bar. The sheet bar is subjected to finish rolling to obtain a hot-rolled sheet. When the heating temperature of the slab is lowered, it is preferable to heat the sheet bar with a bar heater or the like before finish rolling to avoid problems during finish rolling. The rolling finish temperature is preferably equal to or higher than the Ar3 transformation temperature for the purpose of reducing the rolling load and for the reason that an increased rolling reduction of non-recrystallized austenite may result in development of an abnormal microstructure elongated in the rolling direction and deterioration in workability of an annealed sheet.

Finish rolling may be continuously performed by joining the rough-rolled sheets during hot rolling. The rough-rolled sheet (sheet bar) may be coiled once before finish rolling. Part or all of the finish rolling may be conducted as lubrication rolling to reduce the rolling load during hot rolling. Conducting lubrication rolling is effective from the viewpoint of making the shape and material properties of the steel sheet uniform. In lubrication rolling, the coefficient of friction is preferably 0.10 or more, and the coefficient of friction is preferably 0.25 or less.

Coiling temperature after hot rolling: 350° C. or higher and 600° C. or lower

After finish rolling, the hot-rolled sheet is coiled and collected. At that time, by setting the coiling temperature to 350° C. or higher, C diffuses into the oxide scales formed during hot rolling, that is, decarburization of the surface layer of the steel sheet is promoted, and the thickness of softened surface layer of an annealed sheet and the frequency of coincidence boundary in the surface layer of the steel sheet can be controlled within the desired ranges. As a result, excellent bendability and LME resistance properties can be obtained. On the other hand, when the coiling temperature after hot rolling is higher than 600° C., the thickness of softened surface layer of an annealed sheet increases, rendering it difficult to obtain a TS of 1180 MPa or more. Therefore, the coiling temperature after hot rolling is set to 350° C. or higher and 600° C. or lower. From the viewpoint of controlling the ratio of the C—strength of the surface layer of the steel sheet to the C-strength of the ¼ thickness position of the steel sheet to 0.7 or less, the coiling temperature after hot rolling is preferably 380° C. or higher and more preferably 410° C. or higher. The coiling temperature after hot rolling is preferably 570° C. or lower and more preferably 550° C. or lower.

Holding time in temperature range of 300° C. or higher after coiling: 5000 seconds or longer This is an extremely important feature of the present disclosure. After the hot-rolled sheet is coiled up to obtain a hot-rolled coil, the hot-rolled coil is held at a temperature range of 300° C. or higher for a holding time of 5000 seconds or longer. The holding time is measured from the point of time when the hot-rolled sheet becomes a hot-rolled coil. This allows C to diffuse into the oxide scales formed during hot rolling, that is, decarburization of the surface layer of the steel sheet is promoted, and the thickness of softened surface layer of an annealed sheet and the frequency of coincidence boundary in the surface layer of the steel sheet can be controlled within the desired ranges. As a result, excellent bendability and LME resistance properties can be obtained. After the hot-rolled sheet is coiled up, it may be kept warm or cooled from the coiling temperature so that the holding time in the temperature range of 300° C. or higher is 5000 seconds or longer, or it may be once cooled from the coiling temperature to lower than 300° C., and then reheated to 300° C. or higher and allowed to be held in the temperature range of 300° C. or higher for 5000 seconds or longer. On the other hand, the upper limit of the holding time in the temperature range of 300° C. or higher after coiling is not specified. However, the holding time in the temperature range of 300° C. or higher after coiling is preferably 100000 seconds or shorter to obtain a TS within a suitable range. Therefore, the holding time in the temperature range of 300° C. or higher after coiling is set to 5000 seconds or longer. From the viewpoint of controlling the ratio of the C-strength of the surface layer of the steel sheet to the C-strength of the ¼ thickness position of the steel sheet to 0.7 or less, the holding time in the temperature range of 300° C. or higher after coiling is preferably 7000 seconds or longer and more preferably 9000 seconds or longer. The holding time in the temperature range of 300° C. or higher after coiling is preferably 80000 seconds or shorter and more preferably 40000 seconds or shorter. The temperature at which the hot-rolled coil is held is not specified if it is in the temperature range of 300° C. or higher, but it is preferably 600° C. or lower. The temperature at which the hot-rolled coil is held is preferably 350° C. or higher.

The hot-rolled sheet is cooled after being held in the temperature range of 300° C. or higher for 5000 seconds or longer. The cooling rate is not specified, and it may be, for example, 0.001° C./s or higher and 1° C./s or lower. The cooling stop temperature is not specified, and it may be, for example, 20° C. or higher and 200° C. or lower.

Next, the hot-rolled sheet is subjected to pickling. Pickling can remove oxides on the surface of the steel sheet, which is important for ensuring good chemical convertibility and coating or plating quality of the high-strength steel sheet as a final product. The pickling may be performed in one or more batches.

Before or after pickling, the hot-rolled sheet may be subjected to heat treatment. By subjecting the hot-rolled sheet to heat treatment before or after pickling, decarburization of the surface layer of the steel sheet is promoted, and the thickness of softened surface layer of an annealed sheet can be made within a more suitable range. Further, the ratio of the C-strength of the surface layer of the steel sheet to the C-strength of the ¼ thickness position of the steel sheet can be controlled within the desired range. The heat treatment conditions before or after pickling are preferably a temperature range of 450° C. or higher and 650° C. or lower and a holding time of 900 seconds or longer. Although the upper limit of the holding time of the heat treatment is not specified, it is preferably 36000 seconds or shorter.

Next, the hot-rolled sheet after pickling, or the hot-rolled sheet after pickling followed by the heat treatment described above (heat-treated sheet) is subjected to cold rolling to obtain a cold-rolled sheet. In the present disclosure, cold rolling is performed by multi-pass rolling, such as tandem-type multi-stand rolling or reverse rolling, which requires two or more passes.

Accumulated rolling reduction in cold rolling: 30% or more and 75% or less

By setting the accumulated rolling reduction in cold rolling to 30% or more, the area ratio of ferrite can be 25% or less. As a result, the YR can be controlled within the desired range, and excellent dimensional accuracy can be obtained during forming. On the other hand, when the accumulated rolling reduction in cold rolling exceeds 75%, the amount of working strain in the surface layer of the steel sheet increases during cold rolling, the frequency of coincidence boundary in the surface layer of the steel sheet increases after annealing, and the LME resistance properties deteriorate. Therefore, the accumulated rolling reduction in cold rolling is set to 30% or more and 75% or less. The accumulated rolling reduction in cold rolling is preferably 40% or more and more preferably 45% or more. The accumulated rolling reduction in cold rolling is preferably 70% or less and more preferably 65% or less.

In this case, it is a preferable feature of the present disclosure to set the rolling reduction in the final pass to 1% or more and 5% or less and set the rolling reduction in the pass immediately before the final pass to 5% or more and 30% or less.

Rolling reduction in final pass of cold rolling: 1% or more and 5% or less

By properly controlling the rolling reduction in the final pass to build up a cold-rolled microstructure in the surface layer of the steel sheet and then performing annealing, the frequency of coincidence boundary in the surface layer of the steel sheet can be controlled to a more suitable range, and better LME resistance properties can be obtained. By setting the rolling reduction in the final pass of cold rolling to 1% or more, a cold-rolled microstructure can be suitably built up in the surface layer of the steel sheet, the frequency of coincidence boundary in the surface layer of the steel sheet after annealing can be controlled to a more suitable range, and better LME resistance properties can be obtained. Further, by setting the rolling reduction in the final pass of cold rolling to 5% or less, the amount of working strain in the surface layer of the steel sheet during cold rolling can be made within a suitable range, the frequency of coincidence boundary in the surface layer of the steel sheet after annealing can be controlled to a more suitable range, and better LME resistance properties can be obtained. Therefore, the rolling reduction in the final pass of cold rolling is preferably 1% or more and 5% or less. The rolling reduction in the final pass of cold rolling is more preferably 2% or more and even more preferably 3% or more. The rolling reduction in the final pass of cold rolling is more preferably 4% or less.

Rolling reduction in pass immediately before final pass: 5% or more and 30% or less By properly controlling the rolling reduction in the pass immediately before the final pass, the area ratio of hard phase after annealing can be controlled within a more suitable range, the TS can be made within a more suitable range, better dimensional accuracy can be obtained during forming, and better ductility can be obtained. By setting the rolling reduction in the pass immediately before the final pass to 5% or more, the hard phases and the area ratio of ferrite can be made within a more suitable range, and the TS can be made within a more suitable range. By setting the rolling reduction in the pass immediately before the final pass to 30% or less, the area ratio of ferrite after annealing can be made within a more suitable range, and better dimensional accuracy and ductility can be obtained during forming.

Therefore, the rolling reduction in the pass immediately before the final pass is preferably 5% or more and 30% or less. The rolling reduction in the pass immediately before the final pass is more preferably 6% or more and even more preferably 7% or more. The rolling reduction in the pass immediately before the final pass is more preferably 28% or less and even more preferably 25% or less.

The number of rolling passes in cold rolling and the rolling reduction in passes other than the final pass and the pass immediately before the final pass are not specified.

Next, the cold-rolled sheet thus obtained is subjected to annealing. Annealing may be performed once or twice. In the following, the first annealing process in the case of performing annealing twice is referred to as a preliminary annealing process, and the second annealing process in the case of performing annealing twice and the first annealing process in the case of performing annealing once are simply referred to as an annealing process. By performing annealing twice, fine retained austenite can be formed, and the ductility and the stretch flangeability can be improved. First, the preliminary annealing process in the case of performing annealing twice will be described.

In the case of performing annealing twice, the heating temperature of the preliminary annealing, that is, the heating temperature after the cold rolling described above and before the annealing process described below, is preferably 830° C. or higher.

Heating temperature of preliminary annealing: 830° C. or higher

By setting the heating temperature of the preliminary annealing to 830° C. or higher, the area ratio of ferrite and quenched martensite in the microstructure after the second annealing process can be further reduced, the YR can be made within a more suitable range, and the dimensional accuracy during forming can be further improved. Further, the area ratio of quenched martensite is further reduced, and the amount of diffusible hydrogen in the steel sheet is also reduced, the number of voids formed after blanking is made within a more suitable range, and the stretch flangeability is further improved. The bendability is further improved, too. Although the upper limit of the heating temperature of the preliminary annealing is not specified, it is preferably 950° C. or lower and more preferably 920° C. or lower to improve the dimensional accuracy during forming. The heating temperature of the preliminary annealing is more preferably 850° C. or higher and even more preferably 870° C. or higher.

The time for heat retaining in the heat treatment of the preliminary annealing is not specified, but it is preferably in a range of 10 seconds or longer and 1000 seconds or shorter.

Next, the cold-rolled sheet, which has been heated to a heating temperature of 830° C. or higher, is preferably cooled under conditions in which the average cooling rate from the heating temperature to 500° C. is 5° C./s or higher.

Average cooling rate from heating temperature of 830° C. or higher to 500° C.: 5° C./s or higher By setting the average cooling rate from the heating temperature of 830° C. or higher to 500° C. to lower than 5° C./s, the amount of ferrite formed during cooling of the preliminary annealing is suppressed, the area ratio of ferrite in the microstructure obtained after the annealing process is within a more suitable range, the area ratio of quenched martensite is within a more suitable range, the YR is within a more suitable range, and the dimensional accuracy during forming can be made within a more suitable range. Further, by making the area ratio of quenched martensite within a more suitable range, the amount of diffusible hydrogen in the steel sheet can also be made within a more suitable range, thereby reducing the number of voids formed after blanking and further improving the stretch flangeability. The bendability can also be made within a more suitable range. Although the upper limit of average cooling rate from the heating temperature of 830° C. or higher to 500° C. is not specified, it is preferably 1000° C./s or lower considering the restrictions on manufacturing technologies. The average cooling rate from the heating temperature of 830° C. or higher to 500° C. is more preferably 8° C./s or higher. The method for cooling the sheet from the heating temperature of 830° C. or higher is not specified, and cooling methods such as gas jet cooling, mist cooling, water cooling, and air cooling may be applied.

After cooling to 500° C. as described above, the average cooling rate, cooling stop temperature and cooling method in a range of lower than 500° C. are not specified. Gas jet cooling, mist cooling, water cooling, air cooling and the like may be applied as the cooling method. In one example, the sheet may be cooled from a temperature of lower than 500° C. to a cooling stop temperature of about room temperature of 450° C. or lower. The average cooling rate from a temperature of lower than 500° C. to the cooling stop temperature is, in one example, 5° C./s or higher and 1000° C./s or lower. When the cooling stop temperature is in a range of 450° C. or lower to about 150° C., the sheet may be held for heat retaining at the cooling stop temperature for 10 seconds or longer and 1000 seconds or shorter and then cooled to a temperature of about room temperature of 50° C. or lower. When the cooling stop temperature is in a range of about 250° C. or lower to about room temperature, the sheet may be, after the cooling stops, held for heat retaining at a temperature higher than the cooling stop temperature for 10 seconds or longer and 1000 seconds or shorter and then cooled to a temperature of about room temperature of 50° C. or lower.

After the above-described preliminary annealing process, the cold-rolled sheet is preferably cooled to 50° C. or lower and then subjected to rolling at an elongation rate of 0.05% or more and 1.00% or less.

Elongation rate of rolling after cooling to 50° C. or lower after preliminary annealing: 0.05% or more and 1.00% or less By performing rolling after cooling to 50° C. or lower after preliminary annealing, it is possible to reduce the frequency of coincidence boundary in the surface layer of the steel sheet after annealing and improve the LME resistance properties. To obtain these effects, the elongation rate of the rolling after cooling to 50° C. or lower after preliminary annealing is preferably 0.05% or more. On the other hand, when the elongation rate of the rolling after cooling to 50° C. or lower after preliminary annealing exceeds 1.00%, the grain sizes of ferrite and hard phases after annealing decrease, resulting in an increase in YR and a decrease in dimensional accuracy during forming. Therefore, the elongation rate of the rolling after cooling to 50° C. or lower after preliminary annealing is preferably 1.00% or less and more preferably 0.70% or less. The elongation rate of the rolling after cooling to 50° C. or lower after preliminary annealing is more preferably 0.10% or more.

The rolling after cooling to 50° C. or lower may be performed (on-line) in an apparatus that is continuous with an annealing apparatus for performing the preliminary annealing process, or it may be performed (off-line) in an apparatus that is discontinuous with the annealing apparatus for performing the preliminary annealing process. Further, the desired elongation rate may be achieved by rolling once, and it is also acceptable to perform rolling two or more times to achieve a total elongation rate of 0.05% or more and 1.00% or less. The rolling as used herein generally refers to temper rolling, but it may be rolling by leveler or other methods as long as an elongation rate equivalent to that of temper rolling can be obtained.

Next, the annealing conditions for the second annealing in the case of performing annealing twice, and the annealing conditions in the case of performing annealing only once are described. In the annealing process, the cold-rolled sheet is heated to a heating temperature of 740° C. or higher and 950° C. or lower in an atmosphere having a dew point of −35° C. or higher, and the cold-rolled sheet is cooled to a cooling stop temperature of 150° C. or higher and 300° C. or lower under conditions where the average cooling rate from the heating temperature to 500° C. is 10° C./s or higher.

First, the cold-rolled sheet after cold rolling or further after preliminary annealing is heated to 740° C. or higher and 950° C. or lower in an atmosphere having a dew point of −35° C. or higher.

Heating temperature of annealing process: 740° C. or higher and 950° C. or lower When the heating temperature of the annealing process is lower than 740° C., the ratio of austenite formed during heating in a two-phase region of ferrite and austenite is insufficient, so that the total area ratio of tempered martensite and bainite and the volume ratio of retained austenite after annealing decrease, and the area ratio of ferrite increases, rendering it difficult to obtain a TS of 1180 MPa or more. On the other hand, when the heating temperature exceeds 950° C., austenite grains grow during heating in a single-phase region of austenite, so that the number of grain boundary triple points of prior austenite decreases, that is, the nucleation sites of retained austenite decrease, so that the volume fraction of retained austenite decreases. On the other hand, when the heating temperature exceeds 950° C., the ductility is deteriorated. Therefore, the heating temperature is set to 740° C. or higher and 950° C. or lower. The heating temperature is preferably 760° C. or higher and more preferably 780° C. or higher. The heating temperature is preferably 900° C. or lower and more preferably 860° C. or lower.

The holding time at the heating temperature is not specified, but it is preferably 10 seconds or longer and 600 seconds or shorter. By setting the holding time at the heating temperature to 10 seconds or longer, the ratio of austenite formed during heating in a two-phase region of ferrite and austenite can be made within a suitable range, so that the total area ratio of tempered martensite and bainite, the area ratio of quenched martensite and the volume ratio of retained austenite after annealing can be made within suitable ranges. Further, the area ratio of ferrite can be made within a suitable range, and the TS can be made within a suitable range. Furthermore, a softened layer in the surface layer of the steel sheet can be formed within a suitable range, the thickness of softened surface layer of the annealed sheet and the ratio of the C-strength of the surface layer of the steel sheet to the C-strength of the ¼ thickness position of the steel sheet can be made within suitable ranges, and the bendability and the LME resistance properties can be made within suitable ranges. By setting the holding time at the heating temperature to 600 seconds or shorter, the thickness of softened surface layer of the annealed sheet can be made within a suitable range, and the TS can be realized within a suitable range. Therefore, the holding time at the heating temperature is preferably 10 seconds or longer and 600 seconds or shorter. The holding time at the heating temperature is more preferably 30 seconds or longer. The holding time at the heating temperature is more preferably 200 seconds or shorter.

Dew point of atmosphere at heating temperature: −35° C. or higher

By setting the dew point of the atmosphere at the heating temperature to −35° C. or higher, decarburization develops through the moisture in the atmosphere, and a softened surface layer can be formed in the surface layer of the steel sheet. As a result, excellent bendability and LME resistance properties can be obtained. Although the upper limit of the dew point in the heating temperature range is not specified, it is preferably 15° C. or lower and more preferably 5° C. or lower to obtain a TS within a suitable range. The dew point at the heating temperature is preferably −30° C. or higher and more preferably −25° C. or higher. The temperature of the above heating temperature range is based on the surface temperature of the steel sheet. That is, when the surface temperature of the steel sheet is the above heating temperature, the dew point of the atmosphere is adjusted so that it is within the above range.

Next, the cold-rolled sheet is cooled to a cooling stop temperature of 150° C. or higher and 300° C. or lower under conditions where the average cooling rate to 500° C. is 10° C./s or higher.

Average cooling rate from heating temperature to 500° C.: 10° C./s or higher

By setting the average cooling rate from the heating temperature of 740° C. or higher and 950° C. or lower to 500° C. to 10° C./s or higher, the area ratio of ferrite can be controlled within the desired range, the YR can be made within the desired range, and excellent dimensional accuracy can be obtained during forming. Further, by suppressing the growth of ferrite during cooling, the area ratio of quenched martensite can be reduced, which decreases the number of voids formed after blanking and improves the stretch flangeability. It also improves the bendability. The upper limit of the average cooling rate from the heating temperature to 500° C. is not specified. However, from the viewpoint of appropriately desorbing diffusible hydrogen, which has entered the steel sheet during annealing, during cooling and improving the stretch flangeability and the bendability, the upper limit of the average cooling rate from the heating temperature to 500° C. is preferably 50° C./s or lower and more preferably 35° C./s or lower. The average cooling rate from the heating temperature to 500° C. is preferably 12° C./s or higher, more preferably 15° C./s or higher, and even more preferably 20° C./s or higher.

Cooling stop temperature of annealing process: 150° C. or higher and 300° C. or lower By setting the cooling stop temperature to a temperature equal to or lower than the martensite transformation start temperature, the area ratio of tempered martensite formed in the heat retention process after reheating, which will be described below, can be increased, and the volume ratio of retained austenite can be made within the desired range. Further, the amount of diffusible hydrogen in the steel sheet can be reduced by transforming a part of austenite into martensite at the stopping of cooling. As a result, the number of voids formed after blanking can be reduced, and the stretch flangeability can be improved. Excellent bendability can also be obtained. When the cooling stop temperature is lower than 150° C., almost all of the untransformed austenite present during cooling transforms to martensite at the stopping of cooling, so that the volume fraction of retained austenite cannot be secured within the desired range, and the ductility deteriorates. On the other hand, when the cooling stop temperature exceeds 300° C., the total area ratio of tempered martensite and bainite decreases, and the area ratio of quenched martensite increases, resulting in a decrease in YR and a decrease in dimensional accuracy during forming. Further, the carbon concentration in retained austenite cannot be made within the desired range, rendering it difficult to secure the ductility and the dimensional accuracy during forming. In addition, the amount of diffusible hydrogen in the steel sheet increases as the area ratio of quenched martensite increases. As a result, the number of voids formed after blanking increases, and the stretch flangeability deteriorates. The bendability also deteriorates. Therefore, the cooling stop temperature is set to 150° C. or higher and 300° C. or lower. The cooling stop temperature is preferably 170° C. or higher and more preferably 190° C. or higher. The cooling stop temperature is preferably 280° C. or lower and more preferably 260° C. or lower.

The average cooling rate from lower than 500° C. to the cooling stop temperature in the cooling is not specified, but it is usually 1° C./s or higher and 50° C./s or lower.

Next, the cold-rolled sheet after the annealing process is reheated to a reheating temperature of (cooling stop temperature+50° C.) or higher and 500° C. or lower and held at the reheating temperature for 10 seconds or longer.

Reheating temperature: (cooling stop temperature+50° C.) or higher and 500° C. or lower By reheating to a temperature higher than the cooling stop temperature after the annealing process, the martensite that exists at the stopping of cooling is tempered, and the C that is supersaturatedly dissolved in martensite is diffused to austenite. As a result, it is possible to form austenite that is stable at room temperature, that is, retained austenite. When the reheating temperature is lower than (cooling stop temperature+50° C.), carbon is not distributed from the martensite formed at the stopping of cooling to untransformed austenite. As a result, the volume fraction of retained austenite cannot be made within the desired range, and the ductility deteriorates. In addition, because the area ratio of quenched martensite increases, the YR decreases, and the dimensional accuracy during forming decreases. Further, the amount of diffusible hydrogen in the steel sheet increases as the area ratio of quenched martensite increases. As a result, the number of voids formed after blanking increases, and the stretch flangeability deteriorates. The bendability also deteriorates.

On the other hand, when the reheating temperature exceeds 500° C., it is difficult to obtain a TS of 1180 MPa or more due to excessive tempering of the martensite formed at the stopping of cooling. Further, the untransformed austenite that exists at the stopping of cooling is decomposed as carbides (pearlite), which deteriorates the ductility. Therefore, the reheating temperature is set to (cooling stop temperature+50° C.) or higher and 500° C. or lower. The reheating temperature is preferably (cooling stop temperature+80° C.) or higher and more preferably (cooling stop temperature+100° C.) or higher. The reheating temperature (of the second annealing) is preferably 450° C. or lower.

Time for heat retaining at reheating temperature: 10 seconds or longer

By performing heat retaining at the reheating temperature, carbon is distributed from the martensite formed at the stopping of cooling to untransformed austenite, and the volume fraction of retained austenite can be achieved within the desired range. When the time for heat retaining at the reheating temperature is shorter than 10 seconds, carbon is not distributed from the martensite formed at the stopping of cooling to untransformed austenite. As a result, the volume fraction of retained austenite cannot be secured within the desired range, and the ductility deteriorates. In addition, because the area ratio of quenched martensite increases, the YR decreases, and the dimensional accuracy during forming decreases. Further, the amount of diffusible hydrogen in the steel sheet increases as the area ratio of quenched martensite increases. As a result, the number of voids formed after blanking increases, and the stretch flangeability deteriorates. The bendability also deteriorates. Therefore, the time for heat retaining at the reheating temperature is set to 10 seconds or longer. The upper limit of the time for heat retaining at the reheating temperature is not specified, but it is preferably 1000 seconds or shorter considering the restrictions on manufacturing technologies. The time for heat retaining at the reheating temperature is preferably 13 seconds or longer and more preferably 16 seconds or longer. The time for heat retaining at the reheating temperature is preferably 1000 seconds or shorter and more preferably 200 seconds or shorter.

The average cooling rate, the cooling stop temperature, and the cooling method after the heat retaining at the reheating temperature are not specified. Gas jet cooling, mist cooling, water cooling, air cooling and the like may be applied as the cooling method. From the viewpoint of preventing oxidation of the steel sheet surface, it is preferable to cool the steel sheet to 50° C. or lower and more preferably to about room temperature after the heat retaining at the reheating temperature. The average cooling rate of the cooling is usually 1° C./s or higher and 50° C./s or lower. When the high-strength steel sheet is to be traded, it is usually cooled to room temperature before being traded.

The high-strength steel sheet may be subjected to temper rolling. When the rolling reduction of the temper rolling exceeds 1.00%, the yield stress of the steel increases, and the dimensional accuracy during forming decreases. Therefore, it is preferably 1.00% or less. The lower limit of the rolling reduction of the temper rolling is not specified, but it is preferably 0.05% or more from the viewpoint of obtaining a YR within a more suitable range. The temper rolling may be performed (on-line) in an apparatus that is continuous with an annealing apparatus for performing the above-described annealing process, or it may be performed (off-line) in an apparatus that is discontinuous with the annealing apparatus for performing the annealing process. Further, the desired rolling reduction may be achieved by rolling once, and it is also acceptable to perform rolling two or more times to achieve a total rolling reduction of 0.05% or more and 1.00% or less. The rolling as used herein generally refers to temper rolling, but it may be rolling by leveler or the like as long as an elongation rate equivalent to that of temper rolling can be obtained.

After the annealing process, the high-strength steel sheet may be subjected to coating or plating treatment. The type of metal for coating or plating is not specified, and it is zinc in one example. Examples of galvanizing treatment include hot-dip galvanizing treatment, and galvannealing treatment where alloying treatment is performed after hot-dip galvanizing treatment. The annealing and the hot-dip galvanizing treatment may be performed (in one line) using an apparatus configured to perform annealing and hot-dip galvanizing treatment continuously. In addition, a hot-dip zinc-aluminum-magnesium alloy coating treatment may be applied.

When hot-dip galvanizing treatment is performed, the high-strength steel sheet is immersed in a galvanizing bath at 440° C. or higher and 500° C. or lower for hot-dip galvanizing treatment, after which the coating weight is adjusted using gas wiping or the like. In the case of hot-dip galvanizing, it is preferable to use a galvanizing bath having a composition in which the Al content is 0.10 mass % or more and 0.23 mass % or less, and the balance consists of Fe and inevitable impurities. When a galvanized layer is subjected to alloying treatment, the alloying treatment of the galvanized layer is performed in a temperature range of 460° C. or higher and 600° C. or lower after hot-dip galvanizing. When the alloying temperature is lower than 460° C., the Zn—Fe alloying rate is too slow, rendering the alloying significantly difficult. On the other hand, when the alloying temperature exceeds 600° C., untransformed austenite may transform to pearlite, resulting in a decrease in TS and ductility. Therefore, when alloying treatment of a galvanized layer is performed, it is preferable to perform the alloying treatment in a temperature range of 460° C. or higher and 600° C. or lower, more preferably 470° C. or higher and 560° C. or lower, and even more preferably 470° C. or higher and 530° C. or lower.

In addition, the weight of coating or plating of the hot-dip galvanized steel sheet (GI) and the galvannealed steel sheet (GA) is preferably 20 g/m$^2$ or more and 80 g/m$^2$ or less per side (double-sided coating or plating). The weight of coating or plating may be adjusted by, for example, gas wiping after galvanizing.

Although the above description focuses on the case of hot-dip galvanizing, a coating or plating layer such as Zn coating or plating, Zn—Ni alloy electroplating, or Al coating or plating may be formed by electroplating. In one example, the coating or plating layer is an electrogalvanized layer. In the case of forming an electrogalvanized layer, a plating solution containing 9 mass % or more and 25 mass % or less of Ni with the balance consisting of Zn and inevitable impurities can be used as a plating solution, for example.

Further, it is preferable to use a plating bath of room temperature or higher and 100° C. or lower. The weight of or plating of the electrogalvanized steel sheet (EG) is preferably 15 g/m² or more and 100 g/m² or less per side (double-sided plating).

As described above, the high-strength steel sheet that has been subjected to coating or plating treatment may be cooled to 50° C. or lower and then subjected to rolling at an elongation rate of 0.05% or more and 1.00% or less. Cracks can be introduced into the coating or plating layer by setting the elongation rate of the rolling, which is performed after cooling to 50° C. or lower, to 0.05% or more. By introducing cracks in the coating or plating layer, the amount of diffusible hydrogen in the steel sheet can be reduced. As a result, the stretch flangeability can be further improved. On the other hand, when the elongation rate of the rolling after cooling to 50° C. or lower exceeds 1.00%, the YR increases, and the dimensional accuracy during forming decreases. Therefore, the elongation rate of the rolling after cooling to 50° C. or lower is preferably 1.00% or less and more preferably 0.70% or less. The elongation rate of the rolling after cooling to 50° C. or lower is more preferably 0.10% or more.

The rolling after cooling to 50° C. or lower may be performed (on-line) in an apparatus that is continuous with a coating or plating apparatus for performing the above-described coating or plating treatment, or it may be performed (off-line) in an apparatus that is discontinuous with the coating or plating apparatus for performing the coating or plating treatment. Further, the desired elongation rate may be achieved by rolling once, and it is also acceptable to perform rolling two or more times to achieve a total elongation rate of 0.05% or more and 1.00% or less. The rolling as used herein generally refers to temper rolling, but it may be rolling by leveler or other methods as long as an elongation rate equivalent to that of temper rolling can be obtained.

After the rolling after cooling to 50° C. or lower as described above, heat retaining may be performed in a temperature range of room temperature or higher and 300° C. or lower. By performing heat retaining in a temperature range of room temperature or higher and 300° C. or lower, the amount of diffusible hydrogen in the steel sheet can be further reduced. As a result, the number of voids formed after blanking is reduced, and the stretch flangeability and the bendability can be improved. The time for heat retention is usually 3 days to 7 days, and it may be up to about 6 months.

Production conditions other than those described above may be according to a conventional method.

EXAMPLES

Steel materials having the chemical compositions listed in Table 1, each with the balance consisting of Fe and inevitable impurities, were prepared by steelmaking in a converter and formed into steel slabs by continuous casting. The resulting steel slabs were heated to 1250° C. and subjected to rough rolled. Next, they were subjected to finish rolling at a rolling finish temperature of 900° C. to obtain hot-rolled sheets. The hot-rolled sheets were coiled at the coiling temperatures listed in Table 2-1 and Table 2-2 to obtain hot-rolled coils. The hot-rolled coils were then held in a temperature range of 300° C. or higher (300° C. to 650° C.) for the time listed in Table 2-1 and Table 2-2 and then cooled to 20° C. to 200° C. at a cooling rate of about 0.001° C./s to 1° C./s. After cooling, the hot-rolled coils were uncoiled to obtain hot-rolled sheets while being subjected to pickling treatment, and then they were subjected to cold rolling. The rolling reduction of the final pass and the pass immediately before the final pass of cold rolling and the accumulated rolling reduction were as listed in Table 2-1 and Table 2-2. The sheet thickness after cold rolling was 1.2 mm.

Next, preliminary annealing treatment and annealing treatment were performed under the conditions listed in Table 2-1 and Table 2-2 to obtain cold-rolled steel sheets (CR). In the preliminary annealing process, the holding time at the heating temperature was 140 seconds to 210 seconds. In the preliminary annealing process, the average cooling rate from lower than 500° C. was 3° C./s to 100° C./s. In the annealing process, the average cooling rate from lower than 500° C. to the cooling stop temperature was 5° C./to 25° C./s. Some cold-rolled steel sheets were further subjected to coating or plating treatment to obtain hot-dip galvanized steel sheets (GI), galvannealed steel sheets (GA), and electrogalvanized steel sheets (EG). In the case of producing GI, the hot-dip galvanizing bath was a zinc bath containing 0.20 mass % of Al with the balance consisting of Zn and inevitable impurities. In the case of producing GA, a zinc bath containing 0.14 mass % of Al with the balance consisting of Zn and inevitable impurities was used. The bath temperature was set to 470° C. to produce both GI and GA. In the case of producing EG, the plating solution contained 9 mass % or more and 25 mass % or less of Ni, with the balance consisting of Zn and inevitable impurities. The coating weight was about 45 g/m² to 72 g/m² per side (double-sided coating) in the case of producing GI, and the coating weight was about 45 g/m² per side (double-sided coating) in the case of producing GA. In the case of producing EG, the plating weight was about 60 g/m² per side (double-sided plating). In the case of producing GA, the alloying treatment was performed at about 550° C. The composition of the coating layer of the GI contained 0.1 mass % to 1.0 mass % of Fe and 0.2 mass % to 1.0 mass % of Al, with the balance consisting of Fe and inevitable impurities. The composition of the coating layer of GA contained 7 mass % to 15 mass % of Fe and 0.1 mass % to 1.0 mass % of Al, with the balance consisting of Fe and inevitable impurities.

TABLE 1

| Steel sample ID | Chemical composition (mass %) | | | | | | | | | | | | |
|---|---|---|---|---|---|---|---|---|---|---|---|---|---|
| | C | Si | Mn | P | S | Al | N | Mo | Cr | Ca | Sb | Ti | Nb |
| A | 0.158 | 1.47 | 2.95 | 0.004 | 0.0006 | 0.063 | 0.0033 | 0.037 | 0.000 | 0.0012 | 0.008 | — | — |
| B | 0.216 | 1.45 | 2.88 | 0.008 | 0.0008 | 0.032 | 0.0040 | 0.000 | 0.045 | 0.0000 | 0.018 | — | — |
| C | 0.211 | 1.57 | 2.75 | 0.014 | 0.0006 | 0.047 | 0.0022 | 0.099 | 0.046 | 0.0002 | 0.000 | — | — |
| D | 0.195 | 1.54 | 2.83 | 0.017 | 0.0017 | 0.055 | 0.0006 | 0.000 | 0.090 | 0.0001 | 0.009 | — | — |
| E | 0.192 | 1.41 | 3.12 | 0.005 | 0.0003 | 0.060 | 0.0042 | 0.000 | 0.022 | 0.0001 | 0.009 | — | — |
| F | 0.213 | 1.54 | 2.60 | 0.017 | 0.0024 | 0.047 | 0.0042 | 0.266 | 0.279 | 0.0003 | 0.005 | — | — |

TABLE 1-continued

| | | | | | | | | | | | | | | |
|---|---|---|---|---|---|---|---|---|---|---|---|---|---|---|
| G | 0.228 | 1.48 | 2.58 | 0.016 | 0.0039 | 0.023 | 0.0007 | 0.033 | 0.069 | 0.0001 | 0.012 | — | — |
| H | 0.101 | 1.35 | 2.89 | 0.030 | 0.0027 | 0.035 | 0.0035 | 0.096 | 0.097 | 0.0002 | 0.005 | — | — |
| I | 0.202 | 2.27 | 2.89 | 0.020 | 0.0022 | 0.033 | 0.0021 | 0.073 | 0.057 | 0.0002 | 0.007 | — | — |
| J | 0.196 | 1.35 | 2.38 | 0.010 | 0.0020 | 0.035 | 0.0048 | 0.138 | 0.083 | 0.0002 | 0.007 | — | — |
| K | 0.212 | 1.52 | 2.49 | 0.013 | 0.0006 | 0.070 | 0.0013 | 0.000 | 0.018 | 0.0002 | 0.006 | — | — |
| L | 0.208 | 1.69 | 3.33 | 0.022 | 0.0007 | 0.053 | 0.0041 | 0.180 | 0.226 | 0.0002 | 0.014 | — | — |
| M | 0.201 | 1.32 | 2.81 | 0.022 | 0.0015 | 0.039 | 0.0022 | 0.069 | 0.032 | 0.0002 | 0.003 | 0.052 | — |
| N | 0.189 | 1.75 | 2.85 | 0.019 | 0.0030 | 0.054 | 0.0019 | 0.000 | 0.043 | 0.0003 | 0.005 | — | 0.004 |
| O | 0.216 | 1.44 | 2.75 | 0.012 | 0.0010 | 0.037 | 0.0020 | 0.000 | 0.060 | 0.0001 | 0.004 | — | — |
| P | 0.196 | 1.60 | 2.71 | 0.011 | 0.0025 | 0.037 | 0.0050 | 0.041 | 0.044 | 0.0003 | 0.004 | 0.024 | — |
| Q | 0.154 | 1.34 | 2.91 | 0.016 | 0.0033 | 0.029 | 0.0045 | 0.000 | 0.053 | 0.0001 | 0.008 | — | — |
| R | 0.165 | 1.38 | 2.82 | 0.030 | 0.0023 | 0.022 | 0.0021 | 0.097 | 0.055 | 0.0003 | 0.014 | — | — |
| S | 0.157 | 1.49 | 2.91 | 0.020 | 0.0034 | 0.034 | 0.0011 | 0.000 | 0.058 | 0.0002 | 0.005 | — | — |
| T | 0.160 | 1.45 | 2.81 | 0.029 | 0.0022 | 0.052 | 0.0028 | 0.065 | 0.056 | 0.0003 | 0.008 | — | — |
| U | 0.195 | 1.34 | 2.90 | 0.012 | 0.0023 | 0.020 | 0.0031 | 0.032 | 0.090 | 0.0003 | 0.005 | — | 0.011 |
| V | 0.165 | 1.40 | 2.86 | 0.011 | 0.0028 | 0.068 | 0.0039 | 0.000 | 0.042 | 0.0001 | 0.005 | — | — |
| W | 0.159 | 1.45 | 2.92 | 0.025 | 0.0029 | 0.025 | 0.0040 | 0.064 | 0.072 | 0.0002 | 0.027 | — | — |
| X | 0.156 | 1.45 | 2.77 | 0.015 | 0.0018 | 0.051 | 0.0019 | 0.000 | 0.064 | 0.0002 | 0.009 | — | — |
| Y | 0.215 | 1.21 | 3.21 | 0.015 | 0.0039 | 0.041 | 0.0036 | 0.000 | 0.076 | 0.0002 | 0.006 | — | — |
| Z | 0.189 | 0.99 | 3.18 | 0.025 | 0.0037 | 0.044 | 0.0016 | 0.000 | 0.034 | 0.0002 | 0.009 | — | — |
| a | 0.190 | 1.61 | 2.82 | 0.028 | 0.0022 | 0.044 | 0.0024 | 0.035 | 0.063 | 0.0001 | 0.241 | — | — |
| b | 0.211 | 1.53 | 2.93 | 0.003 | 0.0028 | 0.036 | 0.0021 | 0.000 | 0.079 | 0.0231 | 0.009 | — | — |

| Steel sample ID | Chemical composition (mass %) | | | | | | | | | | $Mn_{eq}$ | Remarks |
|---|---|---|---|---|---|---|---|---|---|---|---|---|
| | V | B | Cu | Ni | Sn | Ta | Mg | Zn | Co | Zr | REM | | |
| A | — | — | — | — | — | — | — | — | — | — | — | 3.45 | Disclosed steel |
| B | — | — | — | — | — | — | — | — | — | — | — | 3.34 | Disclosed steel |
| C | — | — | — | — | — | — | — | — | — | — | — | 3.53 | Disclosed steel |
| D | — | — | — | — | — | — | — | — | — | — | — | 3.41 | Disclosed steel |
| E | — | — | — | — | — | — | — | — | — | — | — | 3.53 | Disclosed steel |
| F | — | — | — | — | — | — | — | — | — | — | — | 4.13 | Disclosed steel |
| G | — | — | — | — | — | — | — | — | — | — | — | 3.20 | Disclosed steel |
| H | — | — | — | — | — | — | — | — | — | — | — | 3.73 | Comparative steel |
| I | — | — | — | — | — | — | — | — | — | — | — | 3.82 | Comparative steel |
| J | — | — | — | — | — | — | — | — | — | — | — | 3.24 | Comparative steel |
| K | — | — | — | — | — | — | — | — | — | — | — | 2.95 | Comparative steel |
| L | — | — | — | — | — | — | — | — | — | — | — | 4.62 | Comparative steel |
| M | — | — | — | — | — | — | — | — | — | — | — | 3.46 | Disclosed steel |
| N | — | — | — | — | — | — | — | — | — | — | — | 3.43 | Disclosed steel |
| O | 0.038 | — | — | — | — | — | — | — | — | — | — | 3.24 | Disclosed steel |
| P | — | 0.0012 | — | — | — | — | — | — | — | — | — | 3.33 | Disclosed steel |
| Q | — | — | 0.15 | — | — | — | — | — | — | — | — | 3.38 | Disclosed steel |
| R | — | — | — | 0.02 | — | — | — | — | — | — | — | 3.61 | Disclosed steel |
| S | — | — | — | — | 0.016 | — | — | — | — | — | — | 3.44 | Disclosed steel |
| T | — | — | — | — | — | 0.009 | — | — | — | — | — | 3.53 | Disclosed steel |
| U | — | — | — | — | — | 0.012 | — | — | — | — | — | 3.49 | Disclosed steel |
| V | — | — | — | — | — | — | 0.0023 | — | — | — | — | 3.32 | Disclosed steel |
| W | — | — | — | — | — | — | — | 0.004 | 0.009 | 0.006 | — | 3.65 | Disclosed steel |
| X | — | — | — | — | — | — | — | — | — | — | 0.0033 | 3.28 | Disclosed steel |
| Y | — | — | — | — | — | — | — | — | — | — | — | 3.67 | Disclosed steel |
| Z | — | — | — | — | — | — | — | — | — | — | — | 3.57 | Disclosed steel |
| a | — | — | — | — | — | — | — | — | — | — | — | 3.51 | Comparative steel |
| b | — | — | — | — | — | — | — | — | — | — | — | 3.44 | Comparative steel |

Underline indicates that it is outside the proper range of the present disclosure.

TABLE 2-1

| | | Hot rolling treatment | | Cold rolling treatment | | | Preliminary annealing treatment | | | |
|---|---|---|---|---|---|---|---|---|---|---|
| No. | Steel sample ID | Coiling temperature (° C.) | Holding time in temperature range of 300° C. or higher after coiling (s) | Rolling reduction of pass immediately before final pass (%) | Rolling reduction of final pass (%) | Accumulated rolling reduction (%) | Heating temperature (° C.) | Average cooling rate from heating temperature to 500° C. (° C./s) | Elongation rate of rolling after cooling to 50° C. or lower (%) | Annealing treatment Heating temperature (° C.) |
| 1 | A | 550 | 10000 | 25 | 4 | 65 | — | — | — | 800 |
| 2 | B | 480 | 30000 | 13 | 3 | 50 | — | — | — | 850 |
| 3 | C | 490 | 9000 | 16 | 3 | 50 | 850 | 10 | 0.10 | 820 |
| 4 | D | 500 | 20000 | 21 | 3 | 60 | — | — | — | 800 |

TABLE 2-1-continued

| No. | | | | | | | | | | | |
|---|---|---|---|---|---|---|---|---|---|---|---|
| 5 | D | <u>300</u> | 20000 | 21 | 3 | 60 | — | — | — | 800 |
| 6 | D | <u>700</u> | 20000 | 21 | 3 | 60 | — | — | — | 800 |
| 7 | D | 500 | <u>2000</u> | 21 | 3 | 60 | — | — | — | 800 |
| 8 | D | 500 | 20000 | 21 | 3 | <u>20</u> | — | — | — | 800 |
| 9 | D | 500 | 20000 | 21 | 3 | <u>80</u> | — | — | — | 800 |
| 10 | D | 500 | 20000 | 21 | 3 | 60 | — | — | — | <u>720</u> |
| 11 | D | 500 | 20000 | 21 | 3 | 60 | — | — | — | <u>990</u> |
| 12 | D | 500 | 20000 | 21 | 3 | 60 | — | — | — | 800 |
| 13 | D | 500 | 20000 | 21 | 3 | 60 | — | — | — | 800 |
| 14 | D | 500 | 20000 | 21 | 3 | 60 | — | — | — | 800 |
| 15 | D | 500 | 20000 | 21 | 3 | 60 | — | — | — | 800 |
| 16 | D | 500 | 20000 | 21 | 3 | 60 | — | — | — | 800 |
| 17 | D | 500 | 20000 | 21 | 3 | 60 | — | — | — | 800 |
| 18 | D | 500 | 20000 | 21 | 3 | 60 | — | — | — | 800 |
| 19 | E | 490 | 20000 | 13 | 3 | 50 | 870 | 25 | 0.20 | 800 |
| 20 | F | 410 | 10000 | 13 | 3 | 60 | 840 | 30 | — | 820 |
| 21 | G | 410 | 20000 | 23 | 3 | 65 | — | — | — | 920 |
| 22 | <u>H</u> | 590 | 10000 | 16 | 3 | 60 | — | — | — | 800 |
| 23 | <u>I</u> | 560 | 20000 | 25 | 3 | 50 | — | — | — | 800 |
| 24 | <u>J</u> | 490 | 100000 | 25 | 4 | 65 | — | — | — | 800 |
| 25 | <u>K</u> | 550 | 8000 | 23 | 3 | 60 | — | — | — | 830 |

| No. | Holding time at heating temperature (s) | Dew point in heating temperature range (° C.) | Average cooling rate from heating temperature to 500° C. (° C./s) | Cooling stop temperature (° C.) | Reheating temperature (° C.) | Holding time at reheating temperature (s) | Elongation rate (%) | Type* | Remarks |
|---|---|---|---|---|---|---|---|---|---|
| 1 | 70 | −10 | 25 | 230 | 400 | 100 | 0.30 | CR | Example |
| 2 | 60 | −35 | 20 | 260 | 400 | 30 | 0.40 | GA | Example |
| 3 | 140 | −10 | 30 | 200 | 380 | 30 | 0.10 | GA | Example |
| 4 | 90 | −5 | 25 | 230 | 420 | 30 | 0.50 | GA | Example |
| 5 | 90 | −5 | 25 | 230 | 420 | 30 | 0.50 | GA | Comparative Example |
| 6 | 90 | −5 | 25 | 230 | 420 | 30 | 0.50 | GA | Comparative Example |
| 7 | 90 | −5 | 25 | 230 | 420 | 30 | 0.50 | GA | Comparative Example |
| 8 | 90 | −5 | 25 | 230 | 420 | 30 | 0.50 | GA | Comparative Example |
| 9 | 90 | −5 | 25 | 230 | 420 | 30 | 0.50 | GA | Comparative Example |
| 10 | 90 | −5 | 25 | 230 | 420 | 30 | 0.50 | GA | Comparative Example |
| 11 | 90 | −5 | 25 | 230 | 420 | 30 | 0.50 | GA | Comparative Example |
| 12 | 90 | <u>−45</u> | 25 | 230 | 420 | 30 | 0.50 | GA | Comparative Example |
| 13 | 90 | −5 | <u>3</u> | 230 | 420 | 30 | 0.50 | GA | Comparative Example |
| 14 | 90 | −5 | 25 | <u>100</u> | 420 | 30 | 0.50 | GA | Comparative Example |
| 15 | 90 | −5 | 25 | <u>330</u> | 420 | 30 | 0.50 | GA | Comparative Example |
| 16 | 90 | −5 | 25 | 230 | <u>250</u> | 30 | 0.50 | GA | Comparative Example |
| 17 | 90 | −5 | 25 | 230 | <u>550</u> | 30 | 0.50 | GA | Comparative Example |
| 18 | 90 | −5 | 25 | 230 | 420 | <u>5</u> | 0.50 | GA | Comparative Example |
| 19 | 90 | −15 | 30 | 230 | 400 | 30 | 0.20 | GA | Example |
| 20 | 90 | −15 | 25 | 230 | 420 | 30 | 0.20 | EG | Example |
| 21 | 90 | −10 | 25 | 230 | 400 | 30 | 0.20 | GA | Example |
| 22 | 90 | −10 | 30 | 230 | 400 | 150 | 0.50 | CR | Comparative Example |
| 23 | 70 | −5 | 25 | 230 | 380 | 30 | 0.60 | GA | Comparative Example |
| 24 | 90 | −5 | 25 | 230 | 400 | 180 | 0.70 | GA | Comparative Example |
| 25 | 90 | −10 | 25 | 230 | 400 | 30 | 0.30 | GA | Comparative Example |

Underline indicates that it is outside the proper range of the present disclosure.
*CR: cold-rolled steel sheet, GI: hot-dip galvanized steel sheet (without alloying treatment of galvanizing), GA: galvannealed steel sheet, EG: electrogalvanized steel sheet

TABLE 2-2

| | | Hot rolling treatment | | Cold rolling treatment | | | Preliminary annealing treatment | | | |
|---|---|---|---|---|---|---|---|---|---|---|
| No. | Steel sample ID | Coiling temperature (° C.) | Holding time in temperature range of 300° C. or higher after coiling (s) | Rolling reduction of pass immediately before final pass (%) | Rolling reduction of final pass (%) | Accumulated rolling reduction (%) | Heating temperature (° C.) | Average cooling rate from healing temperature to 500° C. (° C./s) | Elongation rate of rolling after cooling to 50° C. or lower (%) | Annealing treatment Heating temperature (° C.) |
| 26 | L | 490 | 20000 | 16 | 3 | 60 | — | — | — | 800 |
| 27 | M̄ | 490 | 20000 | 25 | 4 | 50 | 860 | 15 | 0.10 | 880 |
| 28 | N | 490 | 10000 | 16 | 3 | 50 | 880 | 6 | 0.10 | 800 |
| 29 | O | 550 | 20000 | 25 | 4 | 60 | 880 | 25 | 0.05 | 800 |
| 30 | P | 410 | 20000 | 23 | 3 | 50 | 850 | 700 | 0.10 | 800 |
| 31 | Q | 490 | 10000 | 25 | 3 | 60 | — | — | — | 830 |
| 32 | R | 550 | 30000 | 16 | 3 | 60 | — | — | — | 830 |
| 33 | S | 410 | 20000 | 23 | 3 | 60 | — | — | — | 800 |
| 34 | T | 490 | 9000 | 16 | 3 | 50 | — | — | — | 830 |
| 35 | U | 480 | 20000 | 13 | 3 | 50 | 920 | 35 | 0.50 | 780 |
| 36 | V | 490 | 30000 | 7 | 3 | 35 | — | — | — | 800 |
| 37 | W | 480 | 10000 | 9 | 3 | 40 | — | — | — | 800 |
| 38 | X | 490 | 20000 | 13 | 3 | 60 | — | — | — | 850 |
| 39 | Y | 490 | 30000 | 16 | 3 | 60 | 870 | 15 | 0.10 | 790 |
| 40 | Z | 550 | 9000 | 16 | 3 | 50 | 870 | 20 | 0.10 | 780 |
| 41 | a | 540 | 10000 | 21 | 3 | 50 | — | — | — | 800 |
| 42 | b | 550 | 30000 | 16 | 3 | 60 | — | — | — | 850 |
| 43 | D | 570 | 200000 | 21 | 3 | 60 | — | — | — | 800 |
| 44 | D | 500 | 20000 | 21 | 3 | 60 | — | — | — | 800 |
| 45 | C | 500 | 20000 | 16 | 3 | 60 | 800 | 15 | 0.10 | 820 |
| 46 | C | 500 | 20000 | 16 | 3 | 60 | 860 | 2 | 0.10 | 820 |
| 47 | C | 500 | 20000 | 35 | 0 | 60 | — | — | — | 800 |
| 48 | C | 500 | 20000 | 21 | 7 | 60 | — | — | — | 800 |
| 49 | C | 500 | 20000 | 4 | 3 | 60 | — | — | — | 800 |

| | Annealing treatment | | | | | | | | |
|---|---|---|---|---|---|---|---|---|---|
| No. | Holding time at heating temperature (s) | Dew point in heating temperature range (° C.) | Average cooling rate from heating temperature to 500° C. (° C./s) | Cooling stop temperature (° C.) | Reheating temperature (° C.) | Holding time at reheating temperature (s) | Elongation rate (%) | Type* | Remarks |
| 26 | 90 | −10 | 25 | 230 | 380 | 50 | 0.20 | GA | Comparative Example |
| 27 | 70 | −25 | 30 | 230 | 450 | 20 | 0.20 | GI | Example |
| 28 | 90 | 15 | 25 | 200 | 420 | 30 | 0.30 | GA | Example |
| 29 | 70 | −10 | 25 | 230 | 380 | 30 | 0.20 | GA | Example |
| 30 | 90 | −30 | 25 | 190 | 420 | 20 | 0.10 | GA | Example |
| 31 | 70 | −15 | 15 | 260 | 400 | 20 | 0.30 | GA | Example |
| 32 | 70 | −5 | 12 | 230 | 380 | 40 | 0.50 | GA | Example |
| 33 | 60 | −10 | 25 | 160 | 400 | 40 | 0.50 | GA | Example |
| 34 | 140 | 5 | 25 | 180 | 420 | 30 | 0.20 | GA | Example |
| 35 | 70 | −20 | 20 | 230 | 420 | 40 | 0.05 | GA | Example |
| 36 | 50 | −10 | 25 | 230 | 400 | 30 | 0.80 | GA | Example |
| 37 | 90 | 0 | 25 | 230 | 380 | 30 | 0.50 | GA | Example |
| 38 | 140 | −5 | 35 | 260 | 420 | 500 | 0.03 | GI | Example |
| 39 | 70 | −10 | 25 | 200 | 380 | 12 | 0.20 | GA | Example |
| 40 | 70 | −5 | 30 | 200 | 290 | 200 | 0.20 | GA | Example |
| 41 | 70 | −5 | 30 | 230 | 380 | 30 | 0.20 | GA | Comparative Example |
| 42 | 60 | −5 | 30 | 260 | 380 | 30 | 0.20 | GA | Comparative Example |
| 43 | 90 | −35 | 25 | 230 | 420 | 30 | 0.50 | GA | Example |
| 44 | 850 | −5 | 25 | 230 | 420 | 30 | 0.50 | GA | Example |
| 45 | 140 | −10 | 30 | 200 | 380 | 30 | 0.10 | GA | Example |
| 46 | 140 | −10 | 30 | 200 | 380 | 30 | 0.10 | GA | Example |
| 47 | 90 | −35 | 25 | 230 | 420 | 30 | 0.50 | GA | Example |
| 48 | 90 | −35 | 25 | 230 | 420 | 30 | 0.50 | GA | Example |
| 49 | 90 | −35 | 25 | 230 | 420 | 30 | 0.50 | GA | Example |

Underline indicates that it is outside the proper range of the present disclosure.
*CR: cold-rolled steel sheet, GI: hot-dip galvanized steel sheet (without alloying treatment of galvanizing), GA: galvannealed steel sheet, EG: electrogalvanized steel sheet The cold-rolled steel sheets and each coated or plated steel sheet obtained as described above were used as test steels, and their tensile property, stretch flangeability, bendability and LME resistance properties were evaluated according to the following test methods.

A tensile test was performed in accordance with JIS Z 2241. A JIS No. 5 test piece was collected from each obtained steel sheet so that the longitudinal direction was perpendicular to the rolling direction of the steel sheet. Using the test piece, the tensile test was performed under the condition of a crosshead displacement speed Vc of $1.67 \times 10^{-1}$ mm/s to measure the YS, TS and El. In the present disclosure, a TS of 1180 MPa or more was judged to be acceptable. When the YR, which was an index of dimensional accuracy during forming, was 65% or more and 90% or less, the dimensional accuracy during forming was judged to be good. The YR was calculated based on the above expression (2). Further, when the El was 14% or more, it was judged to have excellent ductility.

The stretch flangeability was evaluated by a hole expanding test. The hole expanding test was performed in accordance with JIS Z 2256. A sample of 100 mm×100 mm was collected from each obtained steel sheet by shearing. A hole with a diameter of 10 mm was punched in the sample with a clearance of 12.5%. Using a die with an inner diameter of 75 mm, the hole diameter at the crack initiation limit was measured by pushing a conical punch with an apex angle of 60 degrees into the hole under a blank holding force of 9 tons (88.26 kN) around the hole. The maximum hole expansion ratio: X (%) was obtained from the following expression (4), and the hole expansion formability was evaluated by the value of the maximum hole expansion ratio.

$$\text{Maximum hole expansion ratio: } \lambda(\%) = \{(D_f - D_0)/D_0\} \times 100 \quad (4)$$

where in the above expression, $D_f$ is the hole diameter (mm) at the time of crack initiation, and $D_0$ is the initial hole diameter (mm). Regardless of the strength of the steel sheet, the stretch flangeability was judged to be good when the value of $\lambda$ was 30% or more.

A bending test was performed in accordance with JIS Z 2248. A strip-shaped test piece with a width of 30 mm and a length of 100 mm was collected from each obtained steel sheet so that the direction parallel to the rolling direction of the steel sheet was the axial direction of the bending test. Next, the bending test was performed using the V-block method with a bending angle of 90 degrees under conditions where the pressing load was 100 kN and the pressing-holding time was 5 seconds. In the present disclosure, a 90-degree V-bending test was performed, the ridgeline of the tip of the bending test piece was observed under a microscope of 40 times (RH-2000: manufactured by Hirox), and the bend radius at which no crack with a crack length of 200 µm or more was recognized was taken as the minimum bend radius (R). The bending test was judged to have a good result when the value (R/t) obtained by dividing R by the sheet thickness (t) was 2.0 or less.

The LME resistance properties were judged by a high-temperature tensile test. As described below, when the test steel was a coated or plated steel sheet, a tensile test piece was cut out from the steel sheet so that it included the coating or plating layer, and the tensile test piece was subjected to a high-temperature tensile test. On the other hand, when the test steel is a cold-rolled steel sheet without coating or plating layer, a coated or plated steel sheet was piled up on the cold-rolled steel sheet and spot welding was performed to prepare a tensile test piece so that the LME resistance properties when the welding partner was a coated or plated steel sheet could be determined, and the tensile test piece was subjected to a high-temperature tensile test. Then, the frequency of coincidence boundary was determined for the surface layer of the steel sheet on the side joined to the coated or plated steel sheet in the test piece after fracture occurred.

First of all, a strip-shaped sample with a width of 105 mm and a length of 25 mm was collected from each test steel so that the direction perpendicular to the rolling direction of the steel sheet was the tensile direction of the high-temperature tensile test. When a cold-rolled steel sheet was the test steel, a 270 MPa-grade GA steel sheet that had been sheared to the same size and had a sheet thickness of 0.6 mm was piled up on the obtained strip-shaped sample, and spot welding was performed at two ends of the sample to join the cold-rolled steel sheet and the 270 MPa-grade GA steel sheet. The cold-rolled steel sheet that had been joined to a 270 MPa-grade GA steel sheet and each coated or plated steel sheet (GI, GA or EG) were subjected to end grinding to obtain a width of 99 mm and a length of 20 mm. Next, the steel sheet was processed so that the radius of the shoulder part was 20 mm, the width of the parallel part was 5 mm, and the length of the parallel part was 20 mm. Further, notches with a radius of 2 mm were worked with a notch interval of 3 mm in the center of the parallel part on the coating or plating layer side to prepare a notched tensile test piece. From the viewpoint of ensuring the contact with an electrode, the thickness of the notched tensile test piece was adjusted to 1.0 mm. When the test steel was a cold-rolled steel sheet, the thickness of the tensile test piece was adjusted to 1.0 mm by grinding the 270 MPa-grade GA steel sheet by 0.55 mm and grinding the cold-rolled steel sheet by 0.25 mm while leaving the joint surface with the 270 MPa-grade GA steel sheet untouched. When the test steel was each coated or plated steel sheet, the thickness was adjusted to 1.0 mm by performing grinding on one side, and a notched tensile test piece with a coating or plating layer on one side was prepared. Using the obtained notched tensile test pieces, a high-temperature tensile test was performed with a hot working simulation apparatus (Thermecmaster Z, manufactured by Fuji Electronic Industrial Co., Ltd.). A tensile test was performed by raising the temperature to 900° C. at 100° C./s, then immediately subjecting the test piece to gas cooling at 40° C./s to 700° C., and then immediately breaking the test piece at a crosshead speed of 50 mm/s to cause LME cracking. After fracture occurred, the test piece was subjected to gas cooling to 200° C. or lower at 100° C./s.

For the fracture section of the test piece that had been subjected to the high-temperature tensile test as described above, a sample for measuring the thickness reduction was collected by cutting so that a cross section along the sheet thickness direction (L-section) parallel to the rolling direction of the test piece was an observation plane, and the thickness reduction was determined as indicated in the above expression (3). In the present disclosure, it was judged to have excellent LME resistance properties when the thickness reduction was 0.20 or more.

The area ratio of ferrite and hard phases, the volume fraction of retained austenite, the frequency of coincidence boundary in the surface layer of the steel sheet, the amount of diffusible hydrogen in the steel sheet, the thickness of softened surface layer, and the ratio of the C-strength of the surface layer of the steel sheet to the C-strength of the ¼ thickness position of the steel sheet were determined according to the methods described above.

The residual microstructure was also confirmed by microstructural observation. Further, the presence or absence of cracks in the coating or plating layer was examined.

The results are listed in Table 3-1 and Table 3-2.

TABLE 3-1

| No. | Steel sample ID | Area ratio of F (%) | Total area ratio of tempered M + B (%) | Area ratio of quenched M (%) | Volume fraction of RA (%) | Amount of diffusible hydrogen in steel sheet (mass·ppm) | Thickness of softened surface layer (μm) | Presence of crack in coating or plating layer (—) | Frequency of coincidence boundary in surface layer of steel sheet (—) | (C-strength of surface layer of steel sheet)/(C-strength of ¼ thickness position of steel sheet) | Residual microstructure | YS (MPa) | TS (MPa) | YR (%) | El (%) | λ (%) | R/t (—) | Thickness reduction (—) | Remarks |
|---|---|---|---|---|---|---|---|---|---|---|---|---|---|---|---|---|---|---|---|
| 1 | A | 7.8 | 78.3 | 2.5 | 10.5 | 0.07 | 76 | Yes | 0.17 | 0.37 | θ | 957 | 1196 | 80 | 15.2 | 43 | 1.8 | 0.37 | Example |
| 2 | B | 0.0 | 78.1 | 10.2 | 8.6 | 0.20 | 15 | Yes | 0.41 | 0.63 | θ | 919 | 1295 | 71 | 14.6 | 40 | 2.0 | 0.20 | Example |
| 3 | C | 3.0 | 82.0 | 2.0 | 10.4 | 0.16 | 124 | Yes | 0.10 | 0.07 | θ | 827 | 1181 | 70 | 14.6 | 40 | 1.3 | 0.35 | Example |
| 4 | D | 6.7 | 78.3 | 3.1 | 9.1 | 0.06 | 75 | Yes | 0.28 | 0.33 | θ | 993 | 1182 | 84 | 14.6 | 36 | 1.6 | 0.36 | Example |
| 5 | D | 6.1 | 79.0 | 3.6 | 10.9 | 0.17 | 4 | Yes | 0.50 | 0.75 | θ | 1057 | 1244 | 85 | 15.2 | 42 | 2.9 | 0.08 | Comparative Example |
| 6 | D | 7.5 | 78.0 | 3.0 | 9.9 | 0.09 | 164 | Yes | 0.11 | 0.12 | θ | 971 | 1170 | 83 | 15.4 | 44 | 1.7 | 0.34 | Comparative Example |
| 7 | D | 7.4 | 78.8 | 2.7 | 10.6 | 0.16 | 0 | Yes | 0.52 | 0.76 | θ | 902 | 1202 | 75 | 14.9 | 37 | 3.7 | 0.15 | Comparative Example |
| 8 | D | 27.7 | 59.7 | 2.0 | 10.1 | 0.24 | 49 | Yes | 0.19 | 0.22 | θ | 730 | 1216 | 60 | 15.2 | 41 | 1.7 | 0.30 | Comparative Example |
| 9 | D | 7.2 | 78.9 | 3.1 | 10.0 | 0.20 | 70 | Yes | 0.55 | 0.20 | θ | 848 | 1211 | 70 | 14.9 | 45 | 1.8 | 0.07 | Comparative Example |
| 10 | D | 93.5 | 0.0 | 2.0 | 3.3 | 0.10 | 60 | Yes | 0.34 | 0.24 | θ | 645 | 1132 | 57 | 15.0 | 23 | 2.5 | 0.34 | Comparative Example |
| 11 | D | 0.0 | 91.2 | 3.4 | 3.6 | 0.12 | 76 | Yes | 0.19 | 0.25 | θ | 858 | 1209 | 71 | 13.1 | 38 | 1.5 | 0.38 | Comparative Example |
| 12 | D | 8.1 | 78.3 | 3.6 | 9.3 | 0.08 | 2 | Yes | 0.50 | 0.76 | θ | 853 | 1202 | 71 | 15.5 | 36 | 2.9 | 0.06 | Comparative Example |
| 13 | D | 28.2 | 51.9 | 16.1 | 2.8 | 0.15 | 57 | Yes | 0.16 | 0.33 | θ | 725 | 1188 | 61 | 14.6 | 29 | 2.6 | 0.32 | Comparative Example |
| 14 | D | 9.2 | 83.3 | 2.4 | 1.5 | 0.18 | 57 | Yes | 0.23 | 0.20 | θ | 888 | 1234 | 72 | 12.4 | 41 | 1.6 | 0.30 | Comparative Example |
| 15 | D | 10.9 | 58.8 | 18.9 | 8.7 | 0.64 | 46 | Yes | 0.24 | 0.39 | θ | 717 | 1216 | 59 | 15.4 | 23 | 2.5 | 0.32 | Comparative Example |
| 16 | D | 7.0 | 71.1 | 18.1 | 2.7 | 0.62 | 86 | Yes | 0.18 | 0.36 | θ | 714 | 1210 | 59 | 13.0 | 22 | 3.9 | 0.35 | Comparative Example |
| 17 | D | 6.6 | 80.0 | 1.6 | 10.3 | 0.25 | 54 | Yes | 0.18 | 0.23 | θ | 854 | 1154 | 74 | 12.0 | 37 | 1.7 | 0.32 | Comparative Example |
| 18 | D | 6.3 | 71.7 | 18.3 | 2.7 | 0.68 | 66 | Yes | 0.15 | 0.24 | P + θ | 725 | 1229 | 59 | 13.0 | 20 | 3.1 | 0.32 | Comparative Example |
| 19 | D | 7.5 | 78.8 | 2.8 | 10.0 | 0.06 | 47 | Yes | 0.27 | 0.29 | θ | 988 | 1300 | 76 | 15.0 | 38 | 1.5 | 0.35 | Example |
| 20 | E | 12.9 | 75.0 | 3.9 | 8.0 | 0.28 | 54 | Yes | 0.32 | 0.29 | θ | 935 | 1264 | 74 | 14.4 | 32 | 1.9 | 0.30 | Example |
| 21 | F | 0.0 | 83.2 | 2.5 | 6.7 | 0.08 | 35 | Yes | 0.36 | 0.53 | θ | 932 | 1260 | 74 | 14.0 | 35 | 1.8 | 0.33 | Example |
| 22 | G | 29.7 | 59.6 | 2.3 | 8.3 | 0.22 | 120 | Yes | 0.11 | 0.07 | θ | 909 | 1165 | 78 | 14.8 | 40 | 1.5 | 0.33 | Comparative Example |
| 23 | H | 7.5 | 78.5 | 2.4 | 10.8 | 0.23 | 114 | Yes | 0.52 | 0.17 | θ | 945 | 1181 | 80 | 15.1 | 44 | 1.5 | 0.10 | Comparative Example |
| 24 | J | 29.3 | 56.1 | 3.4 | 10.9 | 0.24 | 95 | Yes | 0.12 | 0.15 | θ | 927 | 1159 | 80 | 14.5 | 40 | 1.5 | 0.33 | Comparative Example |
| 25 | K | 27.6 | 55.2 | 3.5 | 10.9 | 0.10 | 20 | Yes | 0.39 | 0.41 | θ | 725 | 1170 | 62 | 14.9 | 43 | 1.9 | 0.28 | Comparative Example |

Underline indicates that it is outside the proper range of the present disclosure.
F: ferrite, M: martensite, B: bainite, RA: retained austenite, P: pearlite, θ: cementite

TABLE 3-2

| No. | Steel sample ID | Area ratio of F (%) | Total area ratio of tempered M + B (%) | Area ratio of quenched M (%) | Volume fraction of RA (%) | Amount of diffusible hydrogen in steel sheet (mass · ppm) | Thickness of softened surface layer (μm) | Presence of crack in coating or plating layer (—) | Frequency of coincidence boundary in surface layer of steel sheet (—) | (C-strength of surface layer of steel sheet)/(C-strength of ¼ thickness position of steel sheet) | Residual micro-structure | YS (MPa) | TS (MPa) | YR (%) | El (%) | λ (%) | R/t (—) | Thickness reduction (—) | Remarks |
|---|---|---|---|---|---|---|---|---|---|---|---|---|---|---|---|---|---|---|---|
| 26 | L | 7.2 | 67.0 | <u>17.5</u> | 8.1 | 0.63 | 52 | Yes | 0.33 | 0.32 | θ | 766 | 1220 | 63 | 15.0 | 19 | 3.9 | 0.34 | Comparative Example |
| 27 | M | 0.0 | 83.8 | <u>2.3</u> | 6.5 | <u>0.05</u> | 68 | Yes | 0.25 | 0.22 | θ | 907 | 1193 | <u>76</u> | 14.4 | <u>42</u> | <u>1.7</u> | 0.35 | Example |
| 28 | N | 13.0 | 74.9 | 4.0 | 7.9 | 0.26 | 65 | Yes | 0.18 | 0.20 | θ | 833 | 1190 | 70 | 15.3 | 34 | 1.8 | 0.23 | Example |
| 29 | O | 7.3 | 79.4 | 2.1 | 11.0 | 0.24 | 54 | Yes | 0.20 | 0.34 | θ | 870 | 1192 | 73 | 15.2 | 38 | 1.7 | 0.35 | Example |
| 30 | P | 8.3 | 78.4 | 3.2 | 9.9 | 0.24 | 15 | Yes | 0.36 | 0.45 | θ | 885 | 1196 | 74 | 15.0 | 44 | 1.8 | 0.26 | Example |
| 31 | Q | 14.3 | 73.0 | 4.2 | 8.3 | 0.35 | 78 | Yes | 0.31 | 0.31 | θ | 819 | 1205 | 68 | 14.8 | 35 | 1.8 | 0.29 | Example |
| 32 | R | 14.5 | 71.1 | 5.2 | 8.9 | 0.22 | 33 | Yes | 0.37 | 0.47 | θ | 813 | 1250 | 65 | 15.0 | 31 | 2.0 | 0.21 | Example |
| 33 | S | 8.8 | 78.5 | 2.7 | 5.5 | 0.23 | 46 | Yes | 0.33 | 0.30 | θ | 999 | 1204 | 83 | 14.1 | 43 | 1.5 | 0.36 | Example |
| 34 | T | 5.1 | 76.8 | 8.5 | 6.9 | 0.23 | 61 | Yes | 0.27 | 0.33 | θ | 901 | 1234 | 73 | 14.3 | 35 | 1.7 | 0.35 | Example |
| 35 | U | 12.3 | 75.9 | 2.5 | 8.9 | 0.22 | 52 | Yes | 0.33 | 0.22 | θ | 840 | 1200 | 70 | 14.6 | 39 | 1.7 | 0.32 | Example |
| 36 | V | 15.9 | 72.0 | 3.2 | 8.5 | 0.17 | 53 | Yes | 0.15 | 0.27 | θ | 808 | 1224 | 66 | 14.9 | 36 | 1.7 | 0.34 | Example |
| 37 | W | 14.6 | 73.7 | 3.2 | 8.3 | 0.11 | 18 | Yes | 0.38 | 0.44 | θ | 885 | 1283 | 69 | 15.4 | 37 | 1.9 | 0.25 | Example |
| 38 | X | 0.0 | 83.8 | 1.5 | 12.7 | 0.05 | 81 | No | 0.17 | 0.30 | θ | 1088 | 1236 | 88 | 15.7 | 47 | 1.1 | 0.42 | Example |
| 39 | Y | 11.7 | 75.8 | 4.4 | 6.5 | 0.33 | 41 | Yes | 0.14 | 0.27 | θ | 809 | 1207 | 67 | 14.4 | 33 | 1.9 | 0.46 | Example |
| 40 | Z | 11.6 | 75.2 | 4.2 | 6.8 | 0.31 | 77 | Yes | 0.06 | 0.35 | θ | 833 | 1243 | 67 | 14.2 | 33 | 1.8 | 0.51 | Example |
| 41 | a | 7.4 | 78.1 | 3.9 | 10.0 | 0.13 | 0 | Yes | 0.51 | <u>0.72</u> | θ | 938 | 1218 | 77 | 14.7 | 42 | 2.9 | <u>0.11</u> | Comparative Example |
| 42 | b | 0.0 | 83.2 | 3.0 | 11.0 | 0.06 | <u>90</u> | Yes | <u>0.20</u> | <u>0.37</u> | θ | 907 | 1243 | 73 | 15.4 | 39 | <u>4.0</u> | <u>0.35</u> | Comparative Example |
| 43 | D | 8.9 | 79.5 | 2.7 | 8.3 | 0.12 | 58 | Yes | 0.24 | <u>0.73</u> | θ | 897 | 1180 | 76 | 15.3 | 44 | <u>1.9</u> | 0.28 | Example |
| 44 | D | 9.2 | 78.5 | 3.1 | 8.7 | 0.07 | 130 | Yes | 0.11 | <u>0.09</u> | θ | 885 | 1180 | 75 | 15.1 | 42 | 1.6 | 0.35 | Example |
| 45 | C | 13.9 | 70.0 | 7.5 | 8.2 | 0.38 | 127 | Yes | 0.14 | 0.05 | θ | 827 | 1234 | 67 | 14.9 | 31 | 1.4 | 0.33 | Example |
| 46 | C | 14.5 | 67.2 | 8.3 | 9.4 | 0.44 | 128 | Yes | 0.14 | 0.07 | θ | 791 | 1199 | 66 | 14.3 | 30 | 1.0 | 0.36 | Example |
| 47 | C | 4.1 | 82.2 | 2.6 | 10.0 | 0.19 | 75 | Yes | 0.44 | 0.41 | θ | 1064 | 1209 | 88 | 15.1 | 43 | 1.5 | 0.21 | Example |
| 48 | C | 7.4 | 79.7 | 3.8 | 8.6 | 0.07 | 48 | Yes | 0.42 | 0.49 | θ | 1057 | 1243 | 85 | 15.0 | 36 | 1.6 | 0.20 | Example |
| 49 | C | 15.7 | 70.9 | 3.6 | 9.4 | 0.22 | 43 | Yes | 0.16 | 0.24 | θ | 861 | 1180 | 73 | 15.4 | 37 | 1.6 | 0.35 | Example |

Underline indicates that it is outside the proper range of the present disclosure.
F: ferrite, M: martensite, B: bainite, RA: retained austenite, P: pearlite, θ: cementite As listed in Table 3-1 and Table 3-2, Examples have a TS of 1180 MPa or more and excellent dimensional accuracy during forming, ductility, stretch flangeability, bendability, and LME resistance properties. On the other hand, in Comparative Examples, at least one of tensile strength (TS), dimensional accuracy during forming (YR), ductility (El), stretch flangeability (λ), bendability (R/t) and LME resistance properties (thickness reduction) are inferior.

INDUSTRIAL APPLICABILITY

By applying the high-strength steel sheet of the present disclosure to structural members such as automotive parts, for example, it is possible to improve fuel efficiency by reducing the weight of automotive bodies.

The invention claimed is:

1. A high-strength steel sheet having a tensile strength of 1180 MPa or more, and a yield ratio YR is 65% or more and 70% or less, which comprises
a chemical composition containing, in mass %,
C: 0.120% or more and 0.250% or less,
Si: 0.80% or more and 2.00% or less,
Mn: more than 2.45% and 4.00% or less,
P: 0.001% or more and 0.100% or less,
S: 0.0200% or less,
Al: 0.010% or more and 1.000% or less, and
N: 0.0100% or less, with
$Mn_{eq}$ obtained with the following expression (1) satisfying a relationship of 3.00% or more and 4.20% or less, and
the balance consisting of Fe and inevitable impurities, wherein $$Mn_{eq}=0.26\times[\% \text{ Si}]+[\% \text{ Mn}]+3.5\times[\% \text{ P}]+2.68\times[\% \text{ Mo}]+1.29\times[\% \text{ Cr}] \quad (1)$$

where the [% X] in the expression (1) represents a content of element X in mass % in the steel, and the [% X] is 0 when the element X is not contained, and
a steel microstructure wherein
an area ratio of ferrite is 25% or less,
a total area ratio of tempered martensite and bainite is 65% or more and 96% or less,
an area ratio of quenched martensite is 15% or less,
a volume fraction of retained austenite is 4% or more and 20% or less,
an amount of diffusible hydrogen in the steel sheet is 0.60 mass ppm or less,
a thickness of softened surface layer is 5 μm or more and 150 μm or less,
should a high-temperature tensile test be performed on the steel sheet, a frequency of coincidence boundary in a surface layer of the steel sheet after the high-temperature tensile test is 0.45 or less, and
the yield ratio YR is expressed by "yield stress YS/tensile strength TS" of the steel sheet.

2. The high-strength steel sheet according to claim 1, wherein a ratio of C-strength of a surface layer to C-strength of a ¼ thickness position of the steel sheet is 0.70 or less.

3. The high-strength steel sheet according to claim 2, wherein the chemical composition further contains, in mass %, at least one selected from the group consisting of
Mo: 0.500% or less,
Cr: 0.300% or less,
Ca: 0.0200% or less,
Sb: 0.200% or less,
Ti: 0.100% or less,
Nb: 0.100% or less,
V: 0.100% or less,
B: 0.0100% or less,
Cu: 1.00% or less,
Ni: 0.50% or less,
Sn: 0.200% or less,
Ta: 0.100% or less,
Mg: 0.0200% or less,
Zn: 0.020% or less,
Co: 0.020% or less,
Zr: 0.020% or less, and
REM: 0.0200% or less.

4. The high-strength steel sheet according to claim 3, which comprises a coating or plating layer on a surface of the steel sheet.

5. The high-strength steel sheet according to claim 2, which comprises a coating or plating layer on a surface of the steel sheet.

6. The high-strength steel sheet according to claim 1, wherein the chemical composition further contains, in mass %, at least one selected from the group consisting of
Mo: 0.500% or less,
Cr: 0.300% or less,
Ca: 0.0200% or less,
Sb: 0.200% or less,
Ti: 0.100% or less,
Nb: 0.100% or less,
V: 0.100% or less,
B: 0.0100% or less,
Cu: 1.00% or less,
Ni: 0.50% or less,
Sn: 0.200% or less,
Ta: 0.100% or less,
Mg: 0.0200% or less,
Zn: 0.020% or less,
Co: 0.020% or less,
Zr: 0.020% or less, and
REM: 0.0200% or less.

7. The high-strength steel sheet according to claim 6, which comprises a coating or plating layer on a surface of the steel sheet.

8. The high-strength steel sheet according to claim 1, which comprises a coating or plating layer on a surface of the steel sheet.

* * * * *